(12) United States Patent
Gold

(10) Patent No.: US 8,713,020 B2
(45) Date of Patent: *Apr. 29, 2014

(54) SYSTEM AND METHOD FOR ORGANIZING, PROCESSING AND PRESENTING INFORMATION

(71) Applicant: David P. Gold, New York, NY (US)

(72) Inventor: David P. Gold, New York, NY (US)

(73) Assignee: David P. Gold, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,433

(22) Filed: Mar. 4, 2013

(65) Prior Publication Data

US 2013/0179457 A1   Jul. 11, 2013

Related U.S. Application Data

(63) Continuation of application No. 11/752,152, filed on May 22, 2007, now Pat. No. 8,392,417.

(60) Provisional application No. 60/747,959, filed on May 23, 2006, provisional application No. 60/912,829, filed on Apr. 19, 2007.

(51) Int. Cl.
*G06F 17/30* (2006.01)

(52) U.S. Cl.
USPC .......................................... 707/737; 705/311

(58) Field of Classification Search
None
See application file for complete search history.

(56) References Cited

U.S. PATENT DOCUMENTS

| 5,794,236 | A  | * | 8/1998  | Mehrle ................................. 1/1 |
| 6,064,968 | A  | * | 5/2000  | Schanz ........................ 705/311 |
| 6,101,503 | A  | * | 8/2000  | Cooper et al. ........................ 1/1 |
| 6,263,351 | B1 | * | 7/2001  | Wolfe ........................... 715/236 |
| 6,501,421 | B1 | * | 12/2002 | Dutta et al. ............. 342/357.22 |
| 6,502,081 | B1 | * | 12/2002 | Wiltshire et al. .............. 706/12 |
| 6,772,149 | B1 | * | 8/2004  | Morelock et al. ..................... 1/1 |
| 7,062,498 | B2 | * | 6/2006  | Al-Kofahi et al. ................... 1/1 |
| 7,293,228 | B1 | * | 11/2007 | Lessing et al. ............... 715/229 |
| 7,529,756 | B1 | * | 5/2009  | Haschart et al. ..................... 1/1 |
| 2002/0123902 | A1 | * | 9/2002  | Lenore et al. ..................... 705/1 |
| 2002/0138529 | A1 | * | 9/2002  | Yang-Stephens et al. ..... 707/530 |
| 2002/0165856 | A1 | * | 11/2002 | Gilfillan et al. ................... 707/3 |
| 2003/0115213 | A1 | * | 6/2003  | Mielenhausen ........... 707/103 R |

(Continued)

OTHER PUBLICATIONS

"BankXX: A Program to Generate Argument through Case-Base Search," by Rissland et al. IN: Proc. of the 4th Int'l Conf. on Artificial Intelligence and Law (1993). Available at: ACM.*

(Continued)

*Primary Examiner* — Daniel Kinsaul
(74) *Attorney, Agent, or Firm* — Dentons US LLP

(57) ABSTRACT

In a method for organizing information in a database, abstractions are separated from expressions of the abstractions to obtain a first set of information corresponding to the abstractions and a second set of information corresponding to at least one set of characteristics relating to the expressions of the abstractions. Each abstraction is arranged within the first set of information hierarchically within the database. Each set of characteristics relating to an expression of an abstraction within the second set of information is associated with an abstraction within the database.

20 Claims, 22 Drawing Sheets

(56) References Cited

U.S. PATENT DOCUMENTS

| | | | |
|---|---|---|---|
| 2003/0135520 A1* | 7/2003 | Mitchell et al. | 707/200 |
| 2004/0138904 A1* | 7/2004 | La Loggia | 705/1 |
| 2004/0193596 A1* | 9/2004 | Defelice et al. | 707/5 |
| 2005/0010605 A1* | 1/2005 | Conrad et al. | 707/104.1 |
| 2005/0076312 A1* | 4/2005 | Gardner et al. | 715/853 |
| 2005/0234968 A1* | 10/2005 | Arumainayagam et al. | 707/102 |
| 2005/0278633 A1* | 12/2005 | Kemp | 715/713 |
| 2006/0075326 A1* | 4/2006 | Patel et al. | 715/501.1 |
| 2006/0248440 A1* | 11/2006 | Rhoads et al. | 715/500 |
| 2007/0078889 A1* | 4/2007 | Hoskinson | 707/102 |
| 2007/0130100 A1* | 6/2007 | Miller | 707/1 |

OTHER PUBLICATIONS

"A Legal Ontology Refinement Environmet using a General Ontology," by Kurematsu et al. IN: Proc. of Workshop 5 on Fifth Generation Computer Systems, 73-89. Tokyo: Institute for New Generation Computer Technology (1995). Available at: http://www.di.unito.it/~guido/ontologie/articoli/yamaguchi.pdf.*

"Visualizing Digital Library Search Results with Categorical and Hierarchical Axes," by Shneiderman et al. In: Proc. of the 5th ACM Conf. on Digital Libraries (2000). Available at: ACM.*

Online Legal Research: A Guide to Legal Research Services and Other Internet Tools, by Gordon, Stacey. William S. Heign & Co., Inc. 2003 (screenshots provided).*

\* cited by examiner

FIG. 15

| Those who undertake abnormally dangerous activities may be held strictly liable for harms caused directly thereby. ||||
|---|---|---|---|
| Court | Law | Date | Case |
| VT | VT | '90 | *Mobbs v. Central Vt. Ry.* |
| 155 Vt. 210, 230 (1990) (holding under Vermont law that "trains and grade crossings [do not] constitute an 'abnormally dangerous activity' such as to warrant the imposition of strict liability to all accidents at railroad crossings where gates have not been installed") ||||
| VT | VT | '69 | *Bosley v. Central Vt. Pub. Serv. Corp.* |
| 127 Vt. 581, 585 (1969) (holding under Vermont law that transmission of electricity by electric company was not an abnormally dangerous activity such as to give rise to strict liability) ||||
| (2) | VT | '68 | *Fakery v. Maditup.* |
| 111 F.2d 9, 12 (2d Cir. 1968) (holding under Vermont law that delivering pizza was not an abnormally dangerous activity such as to give rise to strict liability) ||||
| VT | VT | '63 | *Malloy v. Lane Contr. Corp.* |
| 123 Vt. 500, 503–04 (1963) (holding under Vermont law that users of dangerous explosives in blasting operation are strictly liable for resulting injuries) ||||

| Those who undertake abnormally dangerous activities may not be held strictly liable for harms caused directly thereby. ||||
|---|---|---|---|
| Court | Law | Date | Case |
| NH | NH | '86 | *Bagley v. Controlled Env't Corp.* |
| 127 N.H. 556, 560–61 (1986) (holding under New Hampshire law that dumping hazardous waste does not give rise to strict liability for resulting injury) ||||

*FIG. 16*

| |
|---|
| Selected PROPOSITIONS with AUTHORITIES |
| Under New Hampshire law, the undertaking of an abnormally dangerous activity does not give rise to strict liability. *Bagley v. Controlled Env't Corp.*, 127 N.H. 556, 560–61 (1986) (holding that dumping hazardous waste does not give rise to strict liability for resulting injury). |
| Under Vermont law, those who undertake abnormally dangerous activities may be held strictly liable for harms caused thereby. *Malloy v. Lane Contr. Corp.*, 123 Vt. 500, 503–04 (1963) (holding that users of dangerous explosives in blasting operation are strictly liable for resulting injuries). |

FIG. 21

| The transmission of electricity by an electric company is not an abnormally dangerous activity such as to give rise to strict liability. | | | |
|---|---|---|---|
| Court | *Law* | Date | Case |
|  VT |  VT | '69 | *Bosley v. Central Vt. Pub. Serv. Corp.* |
| 127 Vt. 581, 585 (1969) (holding under Vermont law that transmission of electricity by electric company was not an abnormally dangerous activity such as to give rise to strict liability) | | | |

*FIG. 22*

| Selected PROPOSITIONS with AUTHORITIES |
|---|
| Under New Hampshire law, the undertaking of an abnormally dangerous activity does not give rise to strict liability. *Bagley v. Controlled Env't Corp.*, 127 N.H. 556, 560–61 (1986) (holding that dumping hazardous waste does not give rise to strict liability for resulting injury). |
| Under Vermont law, those who undertake abnormally dangerous activities may be held strictly liable for harms caused thereby. *Malloy v. Lane Contr. Corp.*, 123 Vt. 500, 503–04 (1963) (holding that users of dangerous explosives in blasting operation are strictly liable for resulting injuries). |
| Under Vermont law, the transmission of electricity by an electric company is not an abnormally dangerous activity such as to give rise to strict liability. *Bosley v. Central Vt. Pub. Serv. Corp.*, 127 Vt. 581, 585 (1969) (holding that transmission of electricity by electric company was not an abnormally dangerous activity such as to give rise to strict liability). |

SYSTEM AND METHOD FOR ORGANIZING, PROCESSING AND PRESENTING INFORMATION

CROSS-REFERENCE TO RELATED APPLICATIONS

The present application is a Continuation of U.S. Nonprovisional application Ser. No. 11/752,152 filed 22 May 2007; which claims the benefit of U.S. Provisional Application Ser. No. 60/747,959 filed on May 23, 2006, and U.S. Provisional Application Ser. No. 60/912,829 filed on Apr. 19, 2007; each of which is incorporated herein by reference in its entirety.

BACKGROUND OF THE INVENTION

The invention is a new method for organizing information, and a novel data processing system and method for presenting information so organized for an online research and writing system for professionals.

Research by professionals and other specialists is largely conducted online, through specialized services that provide access to information pertaining to particular areas of knowledge. These services offer enormous advantages over reliance on printed materials, chiefly because they provide easy access to a larger and more up-to-date body of material.

The principal tools now available for finding particular information within the databases of these services are the same tools that anyone might use to search a large mass of largely unorganized documents in any database or on the Internet: word searches, including Boolean and "natural language" searches, and cross-references between documents that cite, or are cited by, each other. Lawyers, for example, often rely on Westlaw or LexisNexis to conduct legal research. A typical search begins with a complex Boolean search of a large database, such as of case law within a particular jurisdiction. The researcher then browses the results, reads some of the cases, and follows hyperlinks within them to other documents, such as to previously decided cases and to statutes. The online services also offer tools for searching for documents that cite a particular case or other document.

These search tools often prove unsatisfactory for professionals because of the large mass of unhelpful documents that even a well-constructed search may return. (A poorly constructed search could return even more unhelpful documents or, alternatively, exclude helpful documents.) This problem is more severe for professionals and other specialists than for general researchers, for two main reasons. First, in comparison with specialists, general researchers tend to seek answers to simpler questions, and questions that can be more clearly defined in advance. The simpler and better-defined the question, the more feasible it is to construct a search that will return primarily documents that address the question. Second, although general researchers searching large databases or the Internet may, like specialists, face voluminous search results, less time is lost wading through the results because there is less need for precision. For example, if for general or personal reasons one seeks to learn the population of Geneva, Switzerland, one can type "population Geneva Switzerland" into an Internet search engine, such as Google or Yahoo!. The number of links returned will be enormous—over two million for each of these engines. Among the first several, however, the researcher will come upon a reasonably trustworthy source reporting that the population is roughly 180,000. At that point the research is complete. A professional, in contrast, often needs not just any expression of the answer, but the best expression of it. A lawyer seeking an answer to a legal question, for example, often seeks the particular case that answers the question most definitively, or most specifically, as it applies to a client's problem. For this reason, a lawyer will often slog through hundreds of search results even after discovering with near certainty the answer to the question posed.

One way to increase a researcher's efficiency is to provide access to similar research that has previously been conducted by others, such as research contained in secondary sources. Existing research systems for professionals do provide some tools by which the researcher can make use of prior research on the same subject to point the researcher to documents more likely to be useful. For example, Westlaw and LexisNexis provide electronic versions of legal treatises that contain hyperlinks to major cases that answer certain questions. Case law researchers on Westlaw can also limit their searches of documents citing a particular case to those documents that cite a particular statement (a "Headnote") within a case, or to those documents that state a disagreement with the case or with a statement in the case. (Westlaw accomplishes this by integrating case Headnotes into a larger taxonomy that it calls the "West Key Number" system.) LexisNexis has a similar service.

As these tools exemplify, certain bodies of information available through professional research services, though large, are sufficiently limited and heavily enough used that it is economically feasible to process the material and classify it substantively to ease the task of researchers. In fact, a wealth of research that could be of potential use to online researchers is already conducted—in the legal field, for example, by those who maintain legal treatises—but is not made available. This research is not available because there is at present no effective means to organize and present it in a way that would maximize the efficiency of subsequent research.

What is needed is a system and method for electronically collecting, organizing, and presenting information pertaining to a particular body of knowledge, that will allow professionals and other specialists to find answers to complex questions quickly and efficiently on the basis of prior research conducted by other professionals, both outside and inside their organizations.

What is also needed is a way to incorporate research results automatically into a written document during the course or research. None of the existing research services for professionals includes an automatic writing component.

SUMMARY OF THE INVENTION

The present invention provides a system and method for organizing information. Information is organized in a particular field, i.e., a field of knowledge, such as, for example, law, sports or entertainment. The information includes two types of information derived from various sources. The first type of information is propositions, which are statements within a field that can be affirmed or denied. The second type of information is abstracts, which include information identifying the proposition and information identifying the source of the proposition. Each proposition is associated with at least one authority, while each authority is associated with one proposition and one source. If, for example, several sources express the same proposition, then each such expression would be represented by an authority for the same proposition. Each such authority would include a reference to the proposition and a reference to the source, as well as important information about the source's expression of the proposition, which might include, for example, the location within the source (for example, a page number) where the proposition is expressed and the context in which the proposition is expressed.

The present invention provides a system and method that will allow professionals and other specialists to find answers to complex questions quickly and efficiently on the basis of prior research conducted by other professionals. The present invention includes a system and method for automating part of the writing process for professionals by converting information collected and organized within the research system into an appropriate form for use in a written document.

The organizational system and data processing system and method for presenting information described in the present invention can serve the needs of researchers in a wide variety of fields, including, but not limited to, science and medicine, the social sciences, the humanities, and the law. Thus, while the specification contained herein describes an example embodiment that particularly addresses the application to legal research, it should not be viewed as limiting the claims to that application.

The present invention also provides a system and method for classifying the two types of information in two separate ways. Propositions may be arranged hierarchically in a taxonomy in which the nodes are propositions and categories of propositions. Two procedural rules governing the creation of the taxonomy are that (i) at any given level of the taxonomy, there are no more than a relatively small or fixed number of sibling nodes, such as, for example, five or seven (however, this number could be more or less depending on the application and/or field in which it is being used), and (ii) the meaning of each node, that is, its relation to its parent or parents, can be, and is, expressed in a relatively small number of words. As the complexity of the taxonomy increases, the hierarchy will extend vertically, such as, for example, by adding levels, rather than by violating either of these rules.

Each authority is associated with a single proposition, for which it provides support. Authorities may be classified in various ways with respect to the support they provide for their associated propositions. For example, authorities may be classified by how strongly and/or how directly they support their associated propositions. Also, for example, authorities may be classified as providing positive, negative, or uncertain support for their associated propositions. Also, for example, authorities may be classified by a characteristic by which propositions are also classified, for example, if law is the field of knowledge, by whether they advantage plaintiffs, defendants, or neither (that is, as to propositions, which party they tend to advantage in the abstract; as to authorities, which party they advantaged in actual application, if any, such as in a judicial decision). Authorities are also classified by additional criteria that do not necessarily affect or pertain to the abstract meaning of the propositions to which they relate. In the law, where the source is a judicial decision, such criteria include, for example, jurisdiction, procedural posture, and type of plaintiff or defendant. Propositions themselves may also impose particular bases of classification on the authorities that are associated with them. For example, authorities associated with propositions concerning an area of law may be classified in various special ways, including, for example, by the categories of issues relating to such law.

Unlike prior systems and methods for organizing research materials, the organizational system and method according to the present invention is not a method of organizing documents (although it is also capable of connecting the researcher to useful documents). Rather, it is a method of organizing and presenting the two forms of information that are most important to researchers. Authorities express the relationship between a proposition and a source that expresses the proposition, and include only the information useful to a researcher whose interest in the source arises from the source's expression of the proposition.

One embodiment of the system and method according to the present invention displays the propositions in a graphical user interface (GUI). The taxonomy of the propositions, for example, may be represented graphically in this GUI and may be customized as desired. The appearance of the GUI may be modified by the user or researcher and may differ considerably from other adaptations based on such user customization.

The appearance of propositions and authorities in the GUI may rely on visual cues, such as, for example, colors, font sizes, and symbols, to express ideas. These visual cues can replace or supplement textual cues or words. Because people can more quickly understand and respond to visual cues than to textual cues, such as words or sentences, the system and method includes the capability of using visual cues to facilitate efficient research. For example, nodes representing categories may utilize visual cues, such as, for example, color, font style, and font size, that differ from the visual cues used for nodes representing propositions, as well as visual images.

Certain conceptual relationships between nodes, such as, for example, between parent and child nodes may also be represented using visual cues. Repeat relationships between parent and child nodes may, therefore, be quickly and easily recognized.

Even where information is conveyed through textual cues, the information is separated into constituent elements that can be conveyed in a relatively small number of words. This relatively small number of words may be all the textual cues that are displayed in the GUI for any given node. More lengthy statements of propositions, as well as fuller descriptions of categories are accessible to the researcher upon demand. These "long-form" versions of textual information, such as for example, information relating to a node's header, may be presented, for example, when the researcher moves a pointing device, mouse or cursor, over the ("short-form") header on the screen, or clicks such a device.

In another embodiment of the present invention the system and method may incorporate parallel alternative organizational schemes. For example, the taxonomy may be polyhierarchical. A researcher may be able to navigate to a particular proposition by focusing in the first instance on a first factor, such as, for example in the case of legal research, on a particular injury, and in the second instance on a second factor, such as, for example, on a particular defendant. Such alternative schemes may be available in circumstances in which researchers would find it convenient to have more than one navigational path available.

Navigational flexibility may also be enhanced by the occasional use of cross-references from a first node to a second node that is neither an ancestor nor a descendant of the first node. Cross-references may, for example, be displayed by a visual cue having a spatial or other relationship to the cross-referencing node. In such case, if the visual cue or the cross-referencing node is queried, such as, for example, by positioning of a cursor or clicking with a mouse, the header of the cross-referenced node may be displayed. The system also provides the capability for a researcher to access a new GUI in the same or a new window, for example, through the cross-referenced node or cross referencing node, which will display the cross-referenced node and its children. The researcher may interact with this new GUI in the same manner as with the original GUI.

Cross-references may be entered manually by the person or people maintaining the database. In that case, a cross-reference may be created on the judgment of a human expert who concludes that, although there is no direct relationship between two nodes that would justify a parent-child relationship in the taxonomy, a researcher interested in one node might value a link to the other node.

Cross-references may alternatively be created automatically by the system, such as, for example, where an unusually large number of researchers follow similar paths that are not connected hierarchically. The system may accomplish this task by recording the choices that researchers make during the course of their research sessions, and apply neural networking learning techniques to generalize from past usage. The system may then automatically add cross-references at points most likely to be useful to the researcher.

The present invention also includes a tool for collecting and organizing information for continuing and subsequent use. For example, this tool can take the form of a GUI that can be used for keeping the information located or selected by a researcher, such as, for example, propositions and authorities, in a logical order so as to facilitate ongoing research and transfer of the information, such as, for example, into a document, file, communication or database.

The data contained in the database of the system may be abstracted from source documents, other databases and other sources of information, containing knowledge within a field. The data may be stored, for example, in a database coupled to a relational database engine, such as, for example, MySQL or PostgreSQL. The data could also be organized and stored in XML format or in any other format. Images may be contained in the same or separate data structures and referred to in the same or separate tables.

The present invention provides a method for organizing information in a database, comprising: separating abstractions from expressions of the abstractions to obtain a first set of information corresponding to the abstractions and a second set of information corresponding to at least one set of characteristics relating to the expressions of the abstractions; arranging each abstraction within the first set of information hierarchically within the database; and associating each set of characteristics relating to an expression of an abstraction within the second set of information with an abstraction within the database.

The present invention further provides a method wherein each abstraction is a proposition.

The present invention also provides a method wherein each set of characteristics relating to an expression of an abstraction is an authority.

The present invention provides a method wherein the arrangement of each abstraction within the first set of information hierarchically within the database creates a taxonomy having a plurality of levels. The present invention also provides a method wherein each level in the taxonomy includes at least one node. The present invention further provides a method wherein each node is a proposition or a category of propositions. The present invention also provides a method wherein each node that is not a top level node includes a subdivision of information from a node at the next higher level in the taxonomy. The present invention provides a method wherein at least one node at each level in the taxonomy includes a subdivision of all of the information from the prior level in the taxonomy.

The present invention provides a method wherein each level in the taxonomy includes at least one element or node. The present invention further provides a method wherein each element or node is represented by a plurality of words. The present invention provides a method wherein the plurality of words does not exceed five words.

The present invention provides a method wherein each expression of an abstraction provides support for the abstraction. The present invention also provides a method wherein the support is classified within the set of characteristics relating to the expression of the abstraction as either positive or negative. The present invention further provides a method wherein the support is classified within the set of characteristics relating to the expression of the abstraction as either positive, negative or uncertain. The present invention provides a method wherein the support is uncertain.

The present invention provides a method wherein each expression of an abstraction is classified according to predetermined criteria within the second set of information.

The present invention provides a system for organizing information, comprising: a processor; a database, wherein the database contains a first set of information comprising abstractions and a second set of information comprising at least one set of characteristics relating to expressions of abstractions, wherein each abstraction within the first set of information is arranged hierarchically within the database, and wherein each set of characteristics relating to an expression of an abstraction within the second set of information is associated with an abstraction within the database.

The present invention also provides a system wherein each abstraction is a proposition. The present invention further provides a system wherein each set of characteristics relating to an expression of an abstraction is an authority.

The present invention further provides a system wherein the arrangement of each abstraction within the first set of information hierarchically within the database creates a taxonomy having a plurality of levels.

The present invention also provides a system wherein each expression of an abstraction provides support for the abstraction.

The present invention further provides a system wherein each expression of an abstraction is classified according to predetermined criteria within the second set of information.

The present invention provides a computer program product for use with a processor, the computer program product comprising: a computer usable medium having computer readable program code embodied therein for use when organizing information in a database, the computer readable program code including: computer readable program code for separating abstractions from expressions of the abstractions to obtain a first set of information corresponding to the abstractions and a second set of information corresponding to at least one set of characteristics relating to the expressions of the abstractions; computer readable program code for arranging each abstraction within the first set of information hierarchically within the database; and computer readable program code for associating each set of characteristics relating to an expression of an abstraction within the second set of information with an abstraction within the database.

The present invention also provides a computer program product wherein each abstraction is a proposition.

The present invention further provides a computer program product wherein each set of characteristics relating to an expression of an abstraction is an authority.

The present invention also provides a computer program product wherein the arrangement of each abstraction within the first set of information hierarchically within the database creates a taxonomy having a plurality of levels.

The present invention further provides a computer program product wherein each set of characteristics relating to an expression of an abstraction provides support for the abstraction.

The present invention also provides a computer program product wherein each expression of an abstraction is classified according to predetermined criteria within the second set of information.

BRIEF DESCRIPTION OF THE DRAWINGS

FIGS. 9-22 are schematics showing partial contents of a computer screen of a researcher using the data processing system and presentational method for a legal research session in the example embodiment. They follow a single sequence:

FIG. 9 shows partial contents of a propositions pane (described below).

FIG. 10 shows partial contents of a propositions pane following the researcher's clicking "U.S." in FIG. 9.

FIG. 11 shows partial contents of a propositions pane following a researcher's selecting a certain option from a contextual menu opening at the "Torts" node of FIG. 10, which causes the research system to clear the screen of ancestor nodes of the selected node and also to display the children of the selected node.

FIG. 12 shows partial contents of a propositions pane following a researcher's clicking "Strict Liability" in FIG. 11.

FIG. 13 shows partial contents of a propositions pane following a researcher's clicking "Abnormal Dangers" in FIG. 12.

FIG. 14 shows partial contents of a propositions pane following a researcher's clicking "Abnormally Dangerous Activities" in FIG. 13.

FIG. 15 shows partial contents of an authorities pane (described below) following a researcher's clicking "Abnormally Dangerous" in FIG. 13.

FIG. 16 shows partial contents of a text pane (described below) following a researcher's selection of two authorities in FIG. 15 for entry into the text pane.

FIG. 17 shows partial contents of a propositions pane following a researcher's clicking "Can" in FIG. 14.

FIG. 18 shows partial contents of a propositions pane following a researcher's selecting a certain option from a contextual menu opening at the "Can Support Strict Liability" node in FIG. 17, which causes the research system to "clean up" the screen by removing siblings of previously selected nodes.

FIG. 19 shows partial contents of a propositions pane following a researcher's clicking "Types of Activities" in FIG. 18.

FIG. 20 shows partial contents of a propositions pane following a researcher's clicking "Electricity" in FIG. 19.

FIG. 21 shows partial contents of an authorities pane following a researcher's clicking "Electricity" in FIG. 19.

FIG. 22 shows partial contents of a text pane following a researcher's selection of an authority in FIG. 21 for entry into the text pane.

DETAILED DESCRIPTION

Definitions

Figure 1:
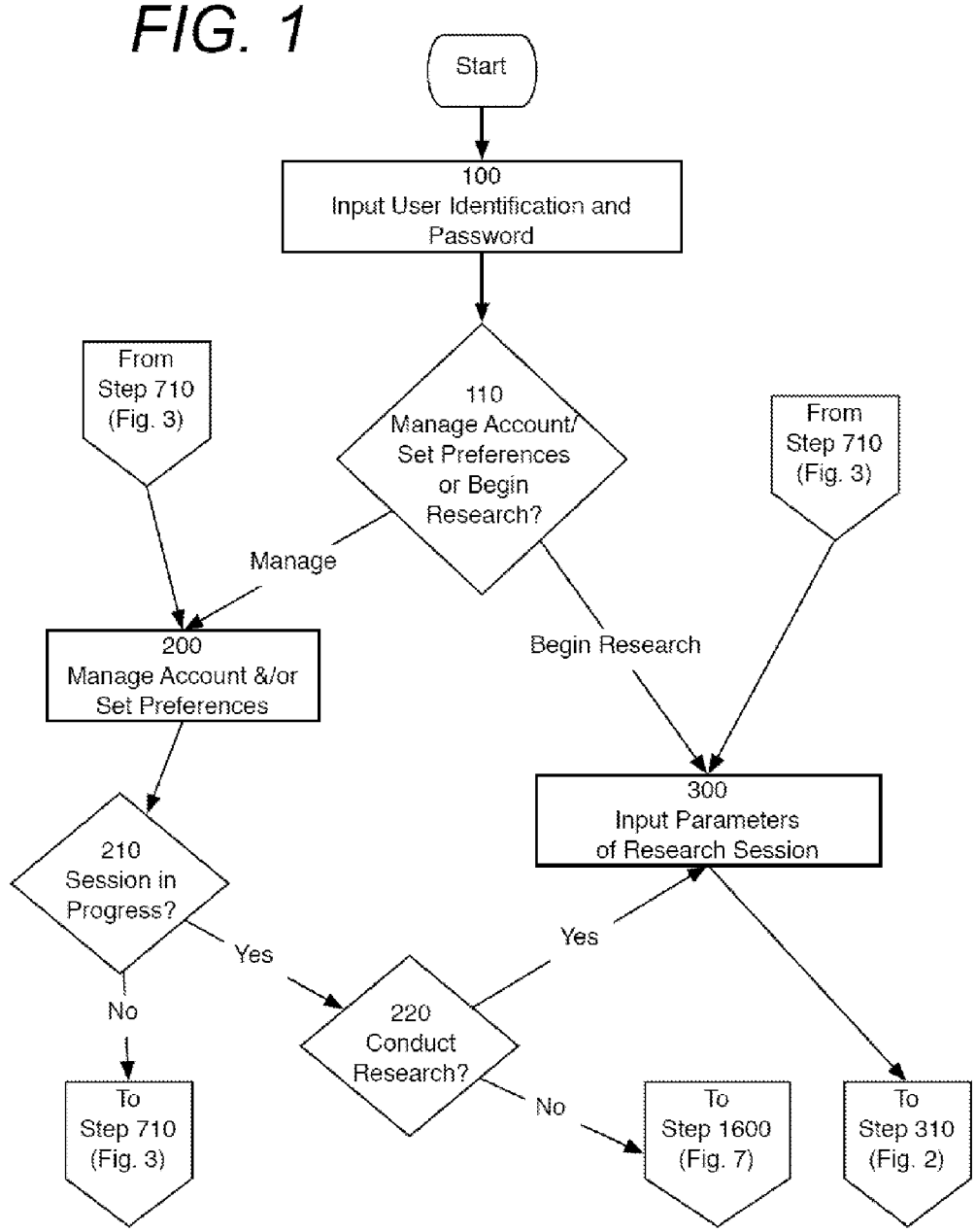
FIGS. 1-7 are flowcharts of the data processing method and presentational system as applied to an example legal research session conducted in the example embodiment.
Figure 2:
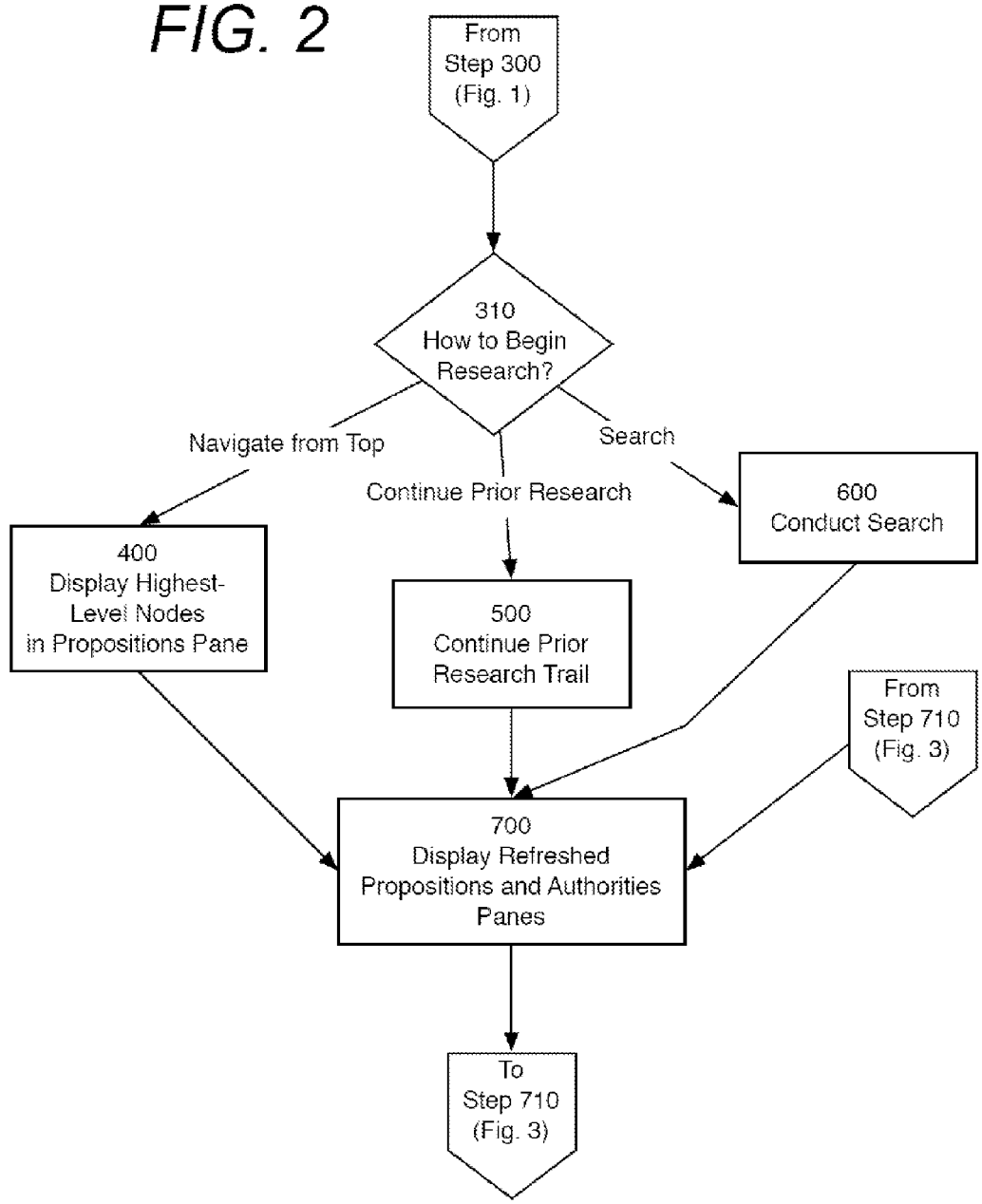
Figure 3:
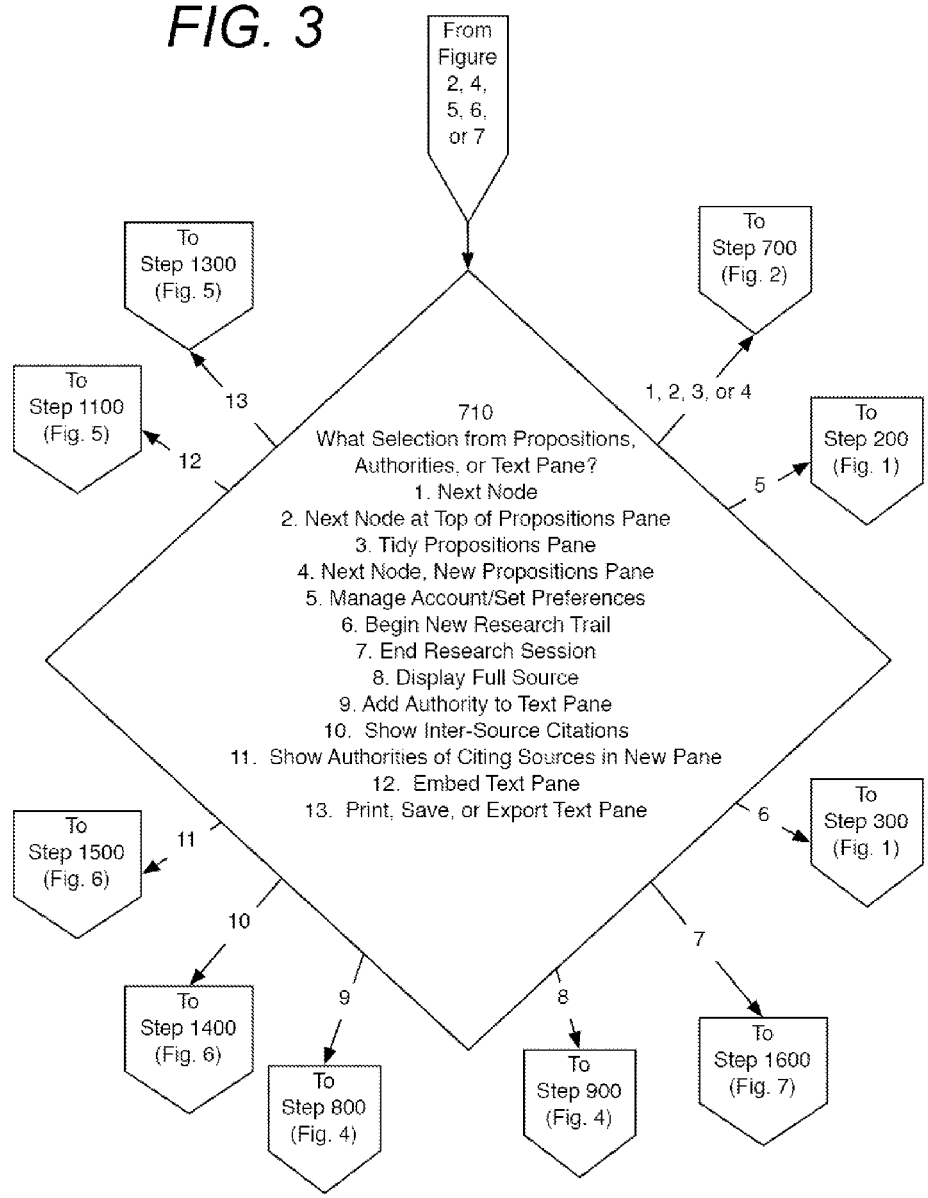
Figure 4:
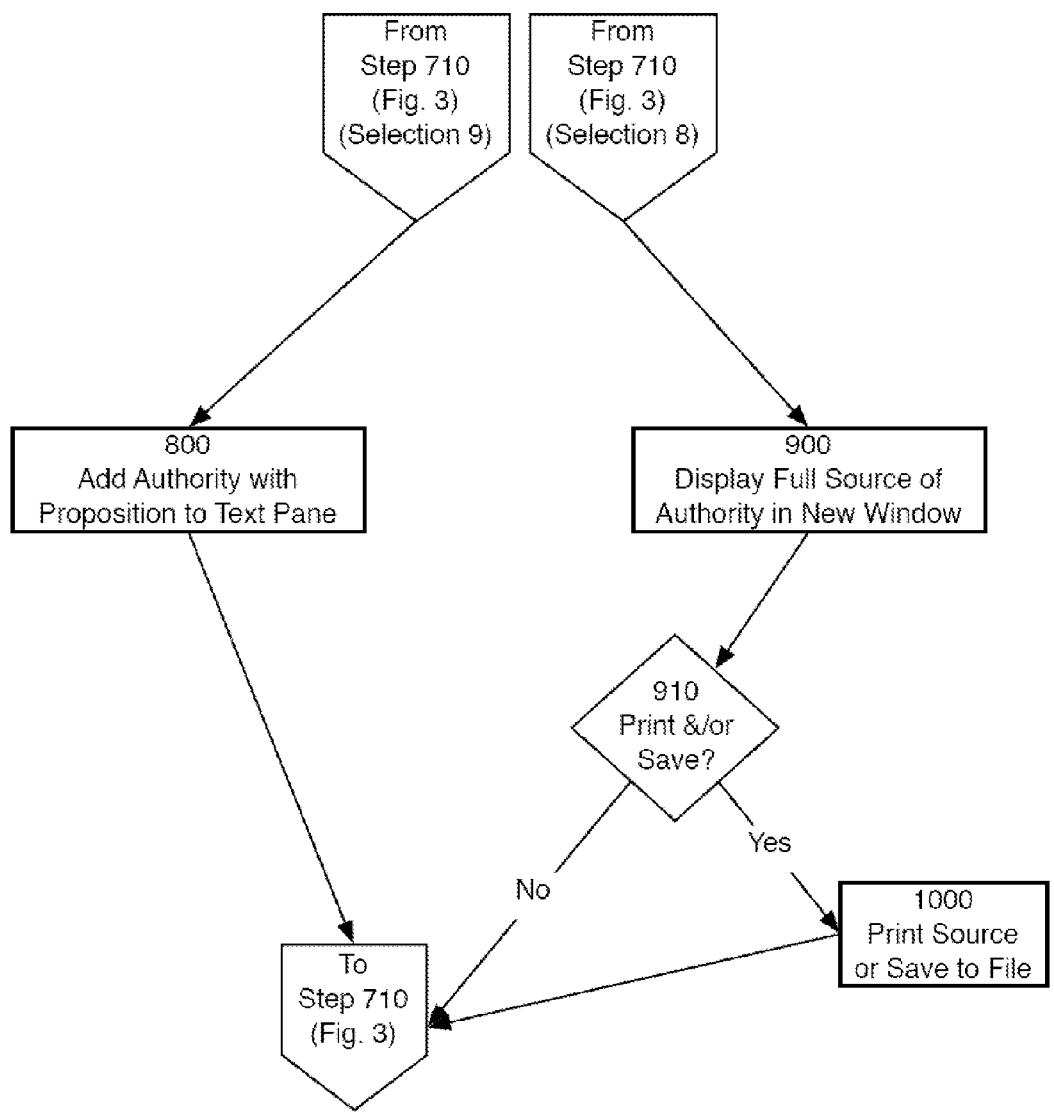
Figure 5:
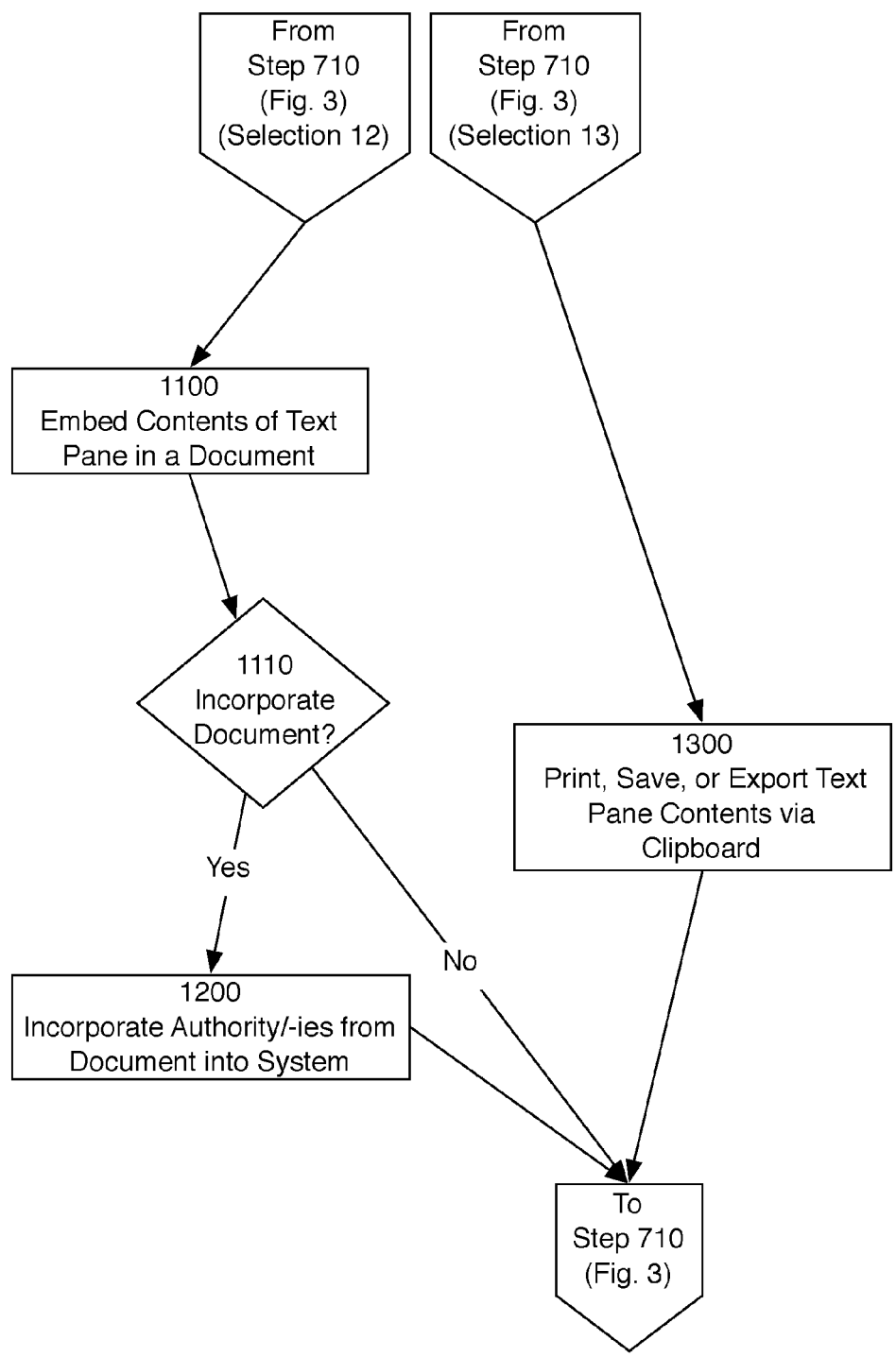
Figure 6:
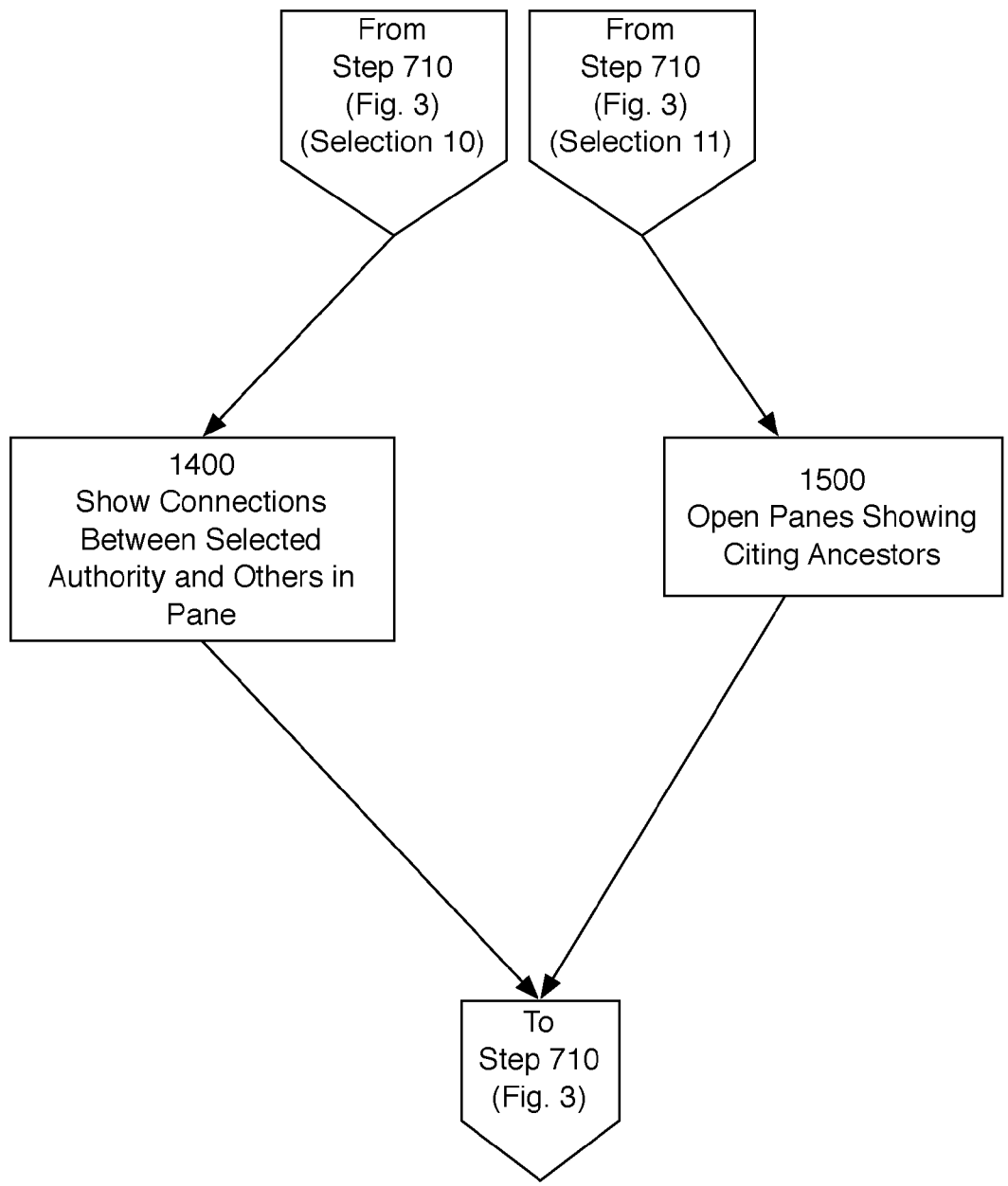
Figure 7:
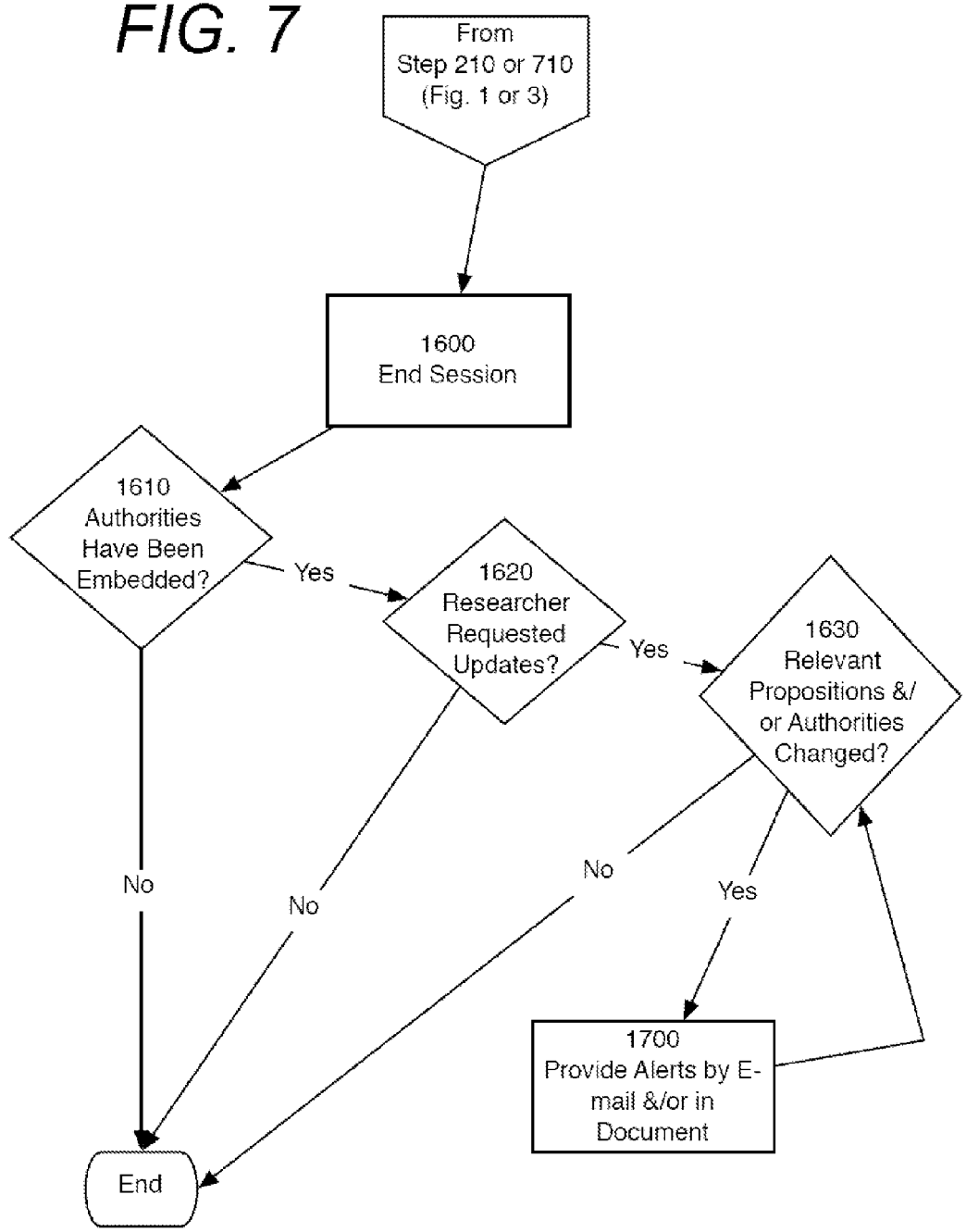

The terms defined in this section are used throughout this application both in their conventional senses and in the defined senses.

"research system"—This means a method and system for organizing and presenting information for the benefit of researchers, and for aiding researchers in creating written work on the basis of their research. The term research system means the invention or any embodiment of the invention as a particular research system.

"researcher"—A researcher is any person using the research system to conduct research.

"field" or "field of knowledge"—Each embodiment of the research system organizes and presents information pertaining to one or more fields of knowledge, each referred to as a field or field of knowledge. Examples of fields include law, medicine, geology, history, and economics. Any subset of a field is itself a field. Thus, for example, constitutional law is a field, as is American history.

"source"—A source is a repository of information about a field from which information provided by and through the research system may be derived. Within the field of law, examples of sources are judicial opinions, statutes, law review articles, and treatises. Sources may include, but are not limited to, electronic, printed, or handwritten documents; audio and video recordings; and oral presentations. Propositions and authorities may be abstracted from sources, as described below. Sources may, but need not, be accessible to researchers.

"proposition"—A proposition is a statement within a field that can be affirmed or denied. The following statement is an example of a proposition within the field of constitutional law: "Congress may not abrogate state sovereign immunity pursuant to the Patent Clause of the United States Constitution, Art. I, §8, cl. 8." The following statement is an example of a proposition within the field of American history: "George Washington inherited his brother's estate in 1752."

Any proposition may be stated as a question to which an answer in the positive is the proposition. Such questions are also referred to as propositions and are identical to their counterparts in statement form. Thus, for example, the question "Did George Washington inherit his brother's estate in 1752?" is a proposition within the field of American history and is identical to the corresponding example proposition in the preceding paragraph. Although propositions may be referred to throughout this application as "statements," it should be understood that any proposition may be stated as either a statement or a question.

A proposition, if true, expresses substantive information within the field, rather than information about the field. Propositions are thus detached from particular expressions of propositions. For example, "Federal District Judge Smith recently held in Jones v. Miller that Congress may not abrogate state sovereign immunity pursuant to the Patent Clause of the United States Constitution, Art. I, §8, cl. 8" is not a proposition within the field of constitutional law. Rather, the (fictional) case Jones v. Miller is a source, which expresses the proposition that Congress may not abrogate state sovereign immunity pursuant to the Patent Clause. (Note, however, that it could, perhaps, be a proposition within another field, one in which federal district courts, rather than law, were the object of study.)

As this example demonstrates, propositions may be abstracted from sources. As this example also demonstrates, propositions may refer to sources—but generally only to sources other than the source of the proposition in question. Thus, for example, the United States Constitution, which the example proposition interprets, may be another source within the field.

More than one source may express the same proposition and may express it in more than one way. For example, many courts and commentators may have stated that Congress may not abrogate state sovereign immunity pursuant to the Patent Clause. Each of these authors may have used different language to state the proposition; some may even have expressed it indirectly, for example by implication. Within a given embodiment of the research system, a proposition stands for the abstraction it represents, not for a particular expression of the abstraction. A new source, therefore, will not necessarily express any new propositions.

Because a proposition stands for an idea, it may be represented within the research system in more than one form. For example it may be represented in an abbreviated form, or a discursive form, and in any language.

The term proposition is also used to describe the set of information that the research system records, organizes, and/or presents about the proposition, including, but not limited to, various ways of representing the proposition (such as described in the preceding paragraph) and the relationship of the proposition to other propositions and/or to categories. The term proposition refers as well to the representation of all or part of that information on a computer screen or other medium.

"support"—A source's expression as to the correctness of a proposition is referred to as support as to that proposition. Support may be classified as positive, negative, or uncertain, among other ways.

"positive" (support)—Positive support for a proposition is an expression within a source that tends to affirm the proposition, or, stated another way, tends to support a "Yes" answer to the proposition stated as a question.

"negative" (support)—Negative support for a proposition is an expression within a source that tends to deny or negate the proposition, or, stated another way, tends to support a "No" answer to the proposition stated as a question.

"uncertain" (support)—Uncertain support for a proposition is an expression within a source that tends to support the view that the correctness of the proposition is uncertain. For example, in the field is law, a statement within a legal opinion that no court has addressed a certain legal issue would constitute uncertain support as to a proposition.

"authority"—Sources that contain support as to a proposition are linked with that proposition by means of an authority. An authority is a set of information that includes information identifying the proposition and information identifying the source. Typically, the authority also includes additional information about the source that would be useful to a researcher who is interested in the source because of the source's support as to the proposition. For example, where the field is law and the source is a legal opinion, the authority might include, among other things, the opinion's author, court, and date; a proper citation to a print publication containing the source; whether the support as to the proposition is positive, negative, or uncertain; the procedural posture giving rise to the expression of the proposition; and the body of substantive law applied in reaching the proposition.

The term authority refers to the information contained in the authority as well as to the representation of all or part of that information on a computer screen or other medium.

"node"—The term node refers to any element in a taxonomy, as well as to the display of that element on a computer screen or other medium. Nodes include propositions and categories.

"category"—A category is a group of propositions identified as sharing a common quality.

"parent"—A node's parent is a node directly superior to it in a taxonomy.

"child"—A node's child is a node directly subordinate to it in a taxonomy.

"ancestor"—A node's ancestors are the nodes superior to it in its direct parent line or lines.

"descendant"—A node's descendants are the nodes subordinate to it in its direct child line or lines.

"sibling"—Siblings are nodes sharing a parent.

"Step"—The term Step refers to any process step, including, for example, the process steps identified by number in FIGS. 1-7.

Introduction

The methods and system are illustrated in the attached diagrams and illustrations (FIGS. 1-22), which are explained below.

A flowchart of the operation of the data processing method of the research system is presented in FIGS. 1-7. It should be understood that not every step must be completed in the course of every research session and that the order of the steps is not critical in most instances.

As explained in the first subsection below (Organization of Information in the Research System), this patent includes a novel method of organizing information.

The example embodiment is for use as a legal research and writing tool. FIGS. 9-22 show the appearance of portions of the researcher's computer screen at various points in a research session to illustrate the system's major features. They are not true "screen shots," in that they do not show the complete contents of any screen. Note also that on some screen configurations not all of the material shown in some of the Figures will be visible simultaneously, but rather will be viewable through the use of scroll bars.

The Figures reflect properties of the example embodiment of the research system and should not be interpreted as precluding alternative properties in any embodiment of the research system, including alternative embodiments as a legal research system. Not all features are shown in the Figures.

The description that follows pertains to the example embodiment. The features and components described pertain to the example embodiment and should be understood not to limit the claims to these particular features or components. At various points within the description certain features and components are described specifically as pertaining to the example embodiment. Such specific references to the example embodiment are reminders that the entire description pertains to the example embodiment; they do not imply any limitation as to features or components described without specific reference to the example embodiment.

In the example embodiment, the research system is implemented as an application on one or more servers, to be accessed on a researcher's computer in either of two ways: through a stand-alone client application or through the researcher's web browser. Most features of the system are available whichever way the researcher chooses to access the system. The research system could be operated, for example, through Internet servers or servers on a local area network, or both (as in the example embodiment). The number of servers used could depend on the number of expected users and/or other efficiency concerns.

In other embodiments the research system could be implemented in other ways, for example, through a specialized desktop application on the researcher's computer or through a plug-in to, or modification of, an existing desktop application, such as the researcher's word processing or e-mail application, accessing information stored either on the researcher's own computer or on remote servers, or both. (One set of functions involving a modification to a word processor is described below. (See below, Text Pane.))

Organization of Information in the Research System

The research system organizes information in the given field of knowledge (law, in the example embodiment) by a novel two-step method: First, it abstracts two separate types of information from sources: propositions and authorities. (See Definitions, above, for the definitions of these three terms.) The creation of propositions and authorities is secondary research, performed by experts, either manually or with the aid of technologies not included in this patent. Each proposition is associated with at least one authority, while each authority is associated with one proposition and one source. If, for example, several judicial decisions (sources) express the same proposition of law (proposition), then each such expression would be represented, in the research system, by an authority for the identical proposition. Each such authority would include a reference to the proposition and a reference to the source, as well as important information about the source's expression of the proposition, which might include, for example, a full citation to the location within the source (for example, a page number) where the proposition is expressed and the context in which the proposition is expressed. For example, if the proposition is "Congress may not abrogate state sovereign immunity pursuant to the Patent Clause of the United States Constitution, Art. I, §8, cl. 8," then an authority might contain the following information: "Fla. Prepaid Postsecondary Educ. Expense Bd. v. College Sav. Bank, 527 U.S. 627, 636 (1999) (invalidating Patent and Plant Variety Protection Remedy Clarification Act, 35 U.S.C. §§271(h), 296(a))," as well as other relevant information about the source.

Second, the research system classifies the two sets of information in two separate ways. Propositions are arranged hierarchically in a taxonomy in which the nodes are propositions and categories of propositions. Two procedural rules governing the creation of the taxonomy in the example embodiment are important to mention here: (i) at any given level of the taxonomy, there are no more than a small, fixed number of sibling nodes, generally five or seven, and (ii) the meaning of each node, that is, its relation to its parent or parents, can be, and is, expressed in no more than a few words. To accommodate complexity, the hierarchy extends vertically, that is, by adding levels, rather than by violating either of these rules. In other embodiments it is possible and appropriate to use more or fewer sibling nodes, depending on the application and nature of the information and use of the information.

Authorities, because they are not at the same level of abstraction as propositions, are not subject to natural hierarchical organization and are organized accordingly. In the example embodiment, each authority is associated with a single proposition, for which it provides one of three types of support: positive, negative, or uncertain, as discussed above (see above, Definitions). In other embodiments, authorities may be classified in other ways with respect to the support they provide for their associated propositions. For example, authorities may be classified by how strongly and/or how directly they support their associated propositions. Also, for example, authorities may be classified by a characteristic by which propositions are also classified, for example, if law is the field of knowledge, by whether they advantage plaintiffs, defendants, or neither (that is, as to propositions, which party they tend to advantage in the abstract; as to authorities, which party they advantaged in actual application, if any, such as in a judicial decision). Authorities are also classified by additional criteria that are important to researchers but do not necessarily affect the abstract meaning of the propositions to which they relate. For example, in the example embodiment, court decisions are classified by jurisdiction, body of substantive law, procedural posture, type of plaintiff, type of defendant, and date, among other criteria. Propositions themselves may also impose particular bases of classification on the authorities that are associated with them. For example, authorities associated with propositions concerning copyright law may be classified in various special ways, including by the type of media to which they most directly relate, if any.

Unlike prior systems for organizing research materials, the organizational method of the research system is not a method of organizing documents. Rather, it is a method of organizing and presenting the two forms of information that are most important to researchers. This information may be abstracted from source documents but is not identical with those documents.

It is instructive to contrast the research system's organizational method with Westlaw's well-known "Key Number" system. The Key Number system is a taxonomy of topics of law that does not extend down to the level of propositions. In West's system, lawyers do identify propositions within cases. Those propositions are classified as "Headnotes" and are assigned a place within the hierarchy of the Key Number system. Unlike propositions in the research system, however, a Headnote is just one case's statement of a particular proposition of law. Each Headnote is thus inextricably bound to the single case to which it belongs. Put another way, in the Headnote system, each statement of law by a court is unique. It is not identical with any other court's statement of the law and is associated, within the classification system, with other similar Headnotes only inasmuch as it may be classified as part of the same topic within the Key Number system. Equally important, it also cannot be said to be the opposite of any other statement of law.

Binding a statement of law to a particular case is a failure of abstraction that inherently limits the power of the Key Number system, in at least two ways. First, it clutters the taxonomy so severely as to render it incapable of supporting an effective navigational tool. One hundred cases each saying substantially the same thing about a particular point of law generate 100 Headnotes, with no meaningful basis for organizing them. Cognitive science research shows that people can maintain only a small number of items in their mind at once. The Key Number system thus unavoidably presents way too many options at each new level of the taxonomy. The Headnotes themselves are also too long to be understood quickly, in part because they naturally contain too much information about the cases to which they belong, and in part because the system is not vertical enough—that is, the Headnote itself must contain all the information that, in a better system, would be signified by the proposition's placement in a particular location in the taxonomy. As a result of all the clutter, Westlaw's online tool for navigating through the hierarchy is clumsy and is not practical to use for navigating (as opposed to conducting text searches) all the way to the level of individual Headnotes.

Second, because each Headnote belongs to a particular document, it is not associated with any other document in the system unless the other document cites the case to which the Headnote belongs. This method of association explains why, even after finding a relevant proposition of law on Westlaw, it is necessary to undertake an onerous process of following links back and forth among cases that cite each other in order to find all the cases that say substantially the same thing—or, often more important, any that say the opposite. In the end, this method may never produce all the relevant cases, since there may be cases that state the same proposition but do not fall within the web of citations that the researcher has discovered. This problem is particularly acute when a researcher seeks law from two or more jurisdictions, neither of which has binding authority over the other, since such courts may not frequently cite each other's decisions. A researcher who has found all the law on an issue within one jurisdiction may be back almost to square one when looking for the same law within another jurisdiction.

The research system eliminates these weaknesses by means of its two-tier method of abstraction. Propositions are abstracted to the point that they have no necessary connection to a particular case. As a result, each one can be associated with any number of expressions of it in particular cases or other documents. Expressions that deny the proposition (negative support) can also be associated with it, as can statements that discuss the proposition without affirming or denying it (uncertain support). Because propositions reflect an abstract system of knowledge, they can be arranged in a logical hierarchy with each element divisible into no more than a small number of subordinate elements (nodes). Headnotes, in contrast, can be placed only into general categories. The organizational structure of propositions within the research system is thus more vertical. It is therefore possible to build a navigational system in which researchers have, at each step, a small number of choices, each expressed in no more than a few words.

Authorities in the research system are unlike any element of the Key Number system. Authorities express the relationship between the proposition and a case or other source that expresses it (source) and include only the information useful to a researcher whose interest in the source arises from the source's expression of the proposition.

The following subsections describe the research system's user interface (as implemented in the example embodiment), which builds upon the research system's organizational method.

Principal Components of the Research System's User Interface

Building upon the research system's novel organizational scheme, the research system's user interface maximizes the researcher's efficiency in locating, and making use of, the desired information. In the example embodiment, research is conducted in three interrelated "panes" on a computer screen, the "propositions pane," the "authorities pane," and the "text pane." At the researcher's option, the panes may appear as three independent windows or as three segments of a single window. By default, the three panes appear as three segments of a single browser window, in the configuration shown in FIG. 8. At times, as described below, the researcher may open more than one propositions or authorities pane; in that case, in the example embodiment, by default a separate window opens for that pane. The purpose and main features of the three panes are described in the following subsections. FIGS. 9-22 show example contents of the three panes in the context of a hypothetical research session. Note that, although not visible in this black and white submission, color is an important element of the propositions and authorities panes in the example embodiment.

Propositions Pane

The research system displays the propositions in the propositions pane. The taxonomy of the propositions, described above, is represented graphically in this pane in a highly customizable user interface. The appearance of the propositions pane may be modified by the researcher and may differ considerably based on such user customization.

Wherever practical the appearance of the propositions pane (and also the authorities pane, described below) relies on visual cues, such as colors, font sizes, and symbols, to express ideas, rather than on words alone. Because people can more quickly understand and respond to visual cues than to words or sentences, the research system relies on visual elements to facilitate efficient research. For example, nodes representing categories may have a common appearance that is distinct from the appearance of nodes representing propositions.

Certain conceptual relationships between parent and child nodes may also be represented visually. In this embodiment, for example, the connective elements in the propositions pane (the arrows in FIG. 9, for example) appear in a distinct form whenever the child represents an exception to the parent, and in a different distinct form whenever the child represents a consequence of the parent. Repeat categories and repeat relationships between parent and child nodes are therefore quickly and easily recognized.

Even where information is conveyed through text, the research system aids the researcher in processing the information by breaking ideas into constituent elements that can be conveyed in a few words (see above, Organization of Information in the Research System, page 17). These few words are all the text that is displayed in any given node in the propositions pane. Full-sentence statements of propositions, as well as fuller descriptions of categories are, however, immediately accessible to the researcher. These "long-form" versions of a node's header appear when the researcher moves the pointer over the ("short-form") header on the screen.

In the example embodiment, when a researcher clicks on a node's header, the research system displays in the propositions pane the children of that node. The research system also refreshes the authorities pane.

Nodes may also by default display the number of positive, uncertain, and negative authorities (as described below) associated with the node and in all the nodes below it in the taxonomy. (This feature is not depicted in the Figures.) These numbers are unlabeled and are displayed in green, yellow, and red, respectively. Authorities filtered by the researcher (see below, Step 300: Input Parameters of Research Session) are not reflected in these numbers, and when all three numbers are zero, the whole node (including the numbers) appears in a light gray form to show the researcher that it is not likely to be a fruitful path. An explanation of the meaning of these numbers appears if the researcher moves the pointer over them. When a researcher clicks on these numbers, the research system opens a window in which the researcher can initiate a full-text search of the sources from which the authorities represented by the numbers are derived. In other words, the researcher can search the text of all sources in the database that pertain to the category or proposition in question. With the exception of this novel method of limiting the sources cited, the search method is similar to that of Westlaw and LexisNexis and is therefore not described in greater detail here. (As discussed below, word searching, including with Boolean statements, is also available as a means of finding a node and as a means of filtering.)

Where appropriate, the research system may incorporate parallel alternative organizational schemes. That is, the taxonomy may be polyhierarchical. For example, the researcher may be able to navigate to a particular proposition by focusing in the first instance on cases about a certain type of injury or, in the alternative, a certain type of defendant. Such alternative schemes are available in circumstances in which researchers would find it convenient to have more than one navigational path available.

Navigational flexibility may also be enhanced by the occasional use of cross-references from a node to a second node that is neither an ancestor nor a descendant of the first. Cross-references (not shown in the Figures) may, for example, be displayed by short arrows emerging from the cross-referencing node that do not point toward any other displayed node. In such case, if the researcher moves the cursor over a cross-reference, the research system displays the header of the cross-referenced node. If the researcher clicks on the cross-reference, a new propositions pane opens, in a new window, displaying the cross-referenced node and its children. The researcher can interact with this new propositions pane in the same manner as with the original propositions pane.

Cross-references are used to point researchers to nodes that are of likely interest but which are on a distant research path. In the example embodiment Cross-references may be produced in either of two ways. First, they may be entered manually by the person or people maintaining the database. In that case, a cross-reference may be created on the judgment of a human expert who concludes that, although there is no direct relationship between two nodes that would justify a parent-child relationship in the taxonomy, a researcher interested in one might value a quick route to the other.

Second, cross-references may be created by the research system technology itself, where an unusually large number of researchers follow similar paths that are not connected hierarchically. The research system accomplishes this task by recording the choices that researchers make during the course of their research sessions, and applying neural networking learning techniques to generalize from past usage. The research system then adds cross-references at points most likely to be useful to the researcher.

In the example embodiment, the researcher may, optionally (see below, Step 200: Manage Account or Set User Preferences) view available research trails of others on the researcher's network. In that case, the research system marks with a special icon, by default an image of a footprint, all nodes of the propositions pane that have been selected by a researcher within the researcher's network. (This feature is not shown in the Figures.) The particular appearance of the icon is determined by the administrator of the local network; the icon may be an office logo, the initials of the firm, or any other standard image or text. (Here it is assumed that it appears as a footprint.)

In the example embodiment, if the researcher clicks on the footprint, the research system displays a checklist of prior research trails that moved through the node in question, including, for each trail, the date, project code, and researcher's identity. The researcher's own prior research trails are included. By default, all the available prior research trails will be checked. The researcher, however, may deselect specific prior research trails, or may apply specific conditions, such as to select only research trails dated within the past month, or only those with a certain project code. Thereafter, the footprint appears in the propositions pane only where a research trail fitting a selected condition, and not specifically deselected, passed through the node in question. (This feature is not depicted in the Figures.)

Authorities Pane

When the researcher selects the header of a node representing a proposition, the research system displays the authorities pane corresponding to that proposition.

In the example embodiment, authorities are grouped in one, two, or three columns within the authority pane, according to the type of support they provide for the proposition: positive, uncertain or negative. In the example embodiment, positive authorities, if any, are displayed on the left side of the authorities pane in a column with a green border. Negative authorities, if any, are displayed on the right side of the authorities pane in a column with a red border. Uncertain authorities, if any, are displayed between the positive and negative authorities (assuming there are both positive and negative authorities to display) in a column with a yellow border.

Although there is no such example in the figures depicting the example embodiment, in some instances authorities could be arranged in columns representing mutually exclusive answers to a single question other than positive, negative, and uncertain answers. Consider, for example, a circumstance in which courts are divided as to the correct test to apply in making a particular legal determination. If courts have applied four mutually contradictory tests, the research system might make each test a proposition and make them each the child of a category node with the header "Tests Courts Have Applied." When a researcher clicks on this node, the research system could display an authorities pane with four columns. Each column could contain the authorities providing positive support as to one of the child propositions.

An alternative to the use of columns within the authorities pane is for the mutually exclusive forms of propositions to be stated in every instance as independent propositions, as children of a common parent within the propositions pane, as described in the preceding paragraphs. Thus, for example, if law is the field of knowledge, a category in the propositions pane might carry the short header "Truth a Defense?" and might have child propositions "Yes," "No," and "Undecided." In this case, in contrast with the example embodiment, the researcher could select each of the propositions individually to find authorities for each of these conflicting propositions. The authorities might then appear in a single column. These two alternatives need not be mutually exclusive, however, as a multicolumn authorities pane could be accessible by clicking the parent category.

The authorities pane displays only those authorities that fall within the filtering preferences selected by the researcher. (See below, Step 200 Manage Account or Set Preferences.) For that reason, although every proposition within the research system is associated with at least one authority, a proposition may lack associated authorities, after filtering, to display in the authorities pane. As discussed above, the number of associated authorities is, by default, displayed in each node of the propositions pane, so the researcher would normally click on such a node only to view the nodes subordinate to it. In that case, the authorities pane simply displays a message that there are no associated authorities.

At the top of each column in the authorities pane, the proposition is restated in the form that is supported by the authorities in that column. Thus, the proposition is stated in precisely opposite forms atop the green and red columns (assuming that those columns both exist). (FIG. 15.)

Below the statement of the proposition, the authorities in each column appear in the order in which the researcher has chosen to sort. (See below, Step 300 Input Parameters of Research Session.) A button within the authorities pane (not shown) allows the researcher to alter the sort and filter preferences.

In the example embodiment each authority is represented by a full citation with pin cite, in a standard form selected by the researcher. (See below, Step 200: Manage Account or Set Preferences.) The citation by default includes a parenthetical explaining how the authority relates to the proposition. These text references to the authorities are customizable by the researcher when selecting or amending preferences. Descriptive text for case law includes case name, citation, signal, and parenthetical descriptions.

In addition to the text citation, each authority may appear with visual images representing the most important information about the authority. Types of visual cues for case law may include those representing jurisdiction; level of court within jurisdiction; body of law applied; whether a case has been reversed or overruled, and whether as to the proposition in question; and procedural posture as to proposition in question, among others. Each type of authority incorporated into the research system has its own set of visual cues with a default format and other formats that the researcher may choose when setting preferences. As in the case of the proposition pane, the visual cues allow the researcher to process information quickly and efficiently. Visual cues are especially important in the authorities pane, because there are sometimes large numbers of authorities associated with a single proposition. Visual cues allow the researcher to judge quickly which among the authorities are most likely to be useful and worth reading, and which should be rejected without review.

The example shown in FIG. 15 provides positive and negative Authorities for the following proposition: "Those who undertake abnormally dangerous activities may be held strictly liable for harms caused thereby." In this example, the jurisdiction and the body of substantive law applied are prominently displayed, along with the year of the decision. States are represented by their shape on the map, while the United States is represented by its flag. The triangles atop the state court symbols indicate the highest court of the state; the "2" on the U.S. flag indicates the Second Circuit. (authorities representing a combination of real and fictional cases are shown in FIG. 15, in order to aid in demonstrating the workings of the research system.)

Although not visible in this black-and-white submission, color is used throughout to convey information. In this example, the columns are color-coded with red and green borders to indicate positive or negative support for the proposition (as stated in the proposition pane, see FIG. 14). In the example embodiment, propositions are stated in such a way that green is used for rules that tend to allow claims to move forward, while red is used for rules that tend to stop claims. The traffic-light analogy (green for "go," red for "stop," yellow for "caution") makes it easy for the researcher to remember. Areas of green and red shading of particular authorities are used to represent the outcome of the decision insofar as it applied the proposition. In the Figure, green and red are represented as two shades of grey, green a lighter shade than red. Thus in this example, the cases in which the decision was for the party disfavoring the application of strict liability are shaded red. The abbreviated date in the "Date" column is blue, and the images of the states are in color as well.

Visual cues in the authorities pane are highly customizable. A researcher might choose, for example, to see the United States represented as an eagle, or to have the states represented by their flags or other official symbols. Although not shown, a range of other information is represented visually at the researcher's option, such as procedural posture (for example, on a motion for summary judgment) and elements of subsequent case history. If a researcher finds the meaning of an image unclear, an explanation will be available by running the mouse over the image. Repeat users, however, will rarely find this step necessary.

At the option of the researcher (see below, Step 200 Manage Account or Set Preferences), the authorities pane may also display links (not shown in Figures) to external commentary on authorities. Clicking on these links opens a separate window (not shown in Figures) in which the researcher can enter a personal comment on the authority and view commentary by others. Commentators may include not only researchers but also representatives of the administrators of the research system. All commentary is moderated by the administrators of the research system and may be removed if viewed as inappropriate or unhelpful. The researcher may choose to limit commentary shown to that by certain commentators, or by commentators meeting certain conditions (such as commentators within the researcher's office, or commentators sponsored by the research system administrators). As described below, authorities may also be filtered and sorted by the information stored as comments. (See below, Step 300.)

As noted above, the research system filters authorities, and sorts them within the appropriate column, according to user preferences. For example, case law may be filtered and sorted based on jurisdiction, court, body of law, and/or signal, strength of support, whether dictum and whether overruled or reversed. In FIG. 15, for example, only cases applying the substantive law of Vermont or New Hampshire are shown, and all cases are sorted by date of decision. Alternatively, a researcher might choose to view only federal cases, for example, and to sort them by procedural posture.

As in the case of the propositions pane, the research system applies machine learning techniques, such as neural networking, to improve the researcher's efficiency in using the authorities pane. The research system records choices that researchers make, including which authorities they select for the text pane (as described below) in conjunction with the filtering and sorting they have chosen in setting parameters. By processing this information in the aggregate (subject to strict privacy protections) the research system, at the researcher's option, recommends a particular authority as the likely best authority for a certain proposition, given the universe of cases that a researcher has chosen to view. (See also related discussion as to machine-generated authorities, below, final paragraphs of subsection entitled, Creating the Propositions and Authorities Data and Database.)

The information collected by the research system about user choices may also be used for other purposes. Such information, again subject to appropriate privacy requirements, may be collected and analyzed as metrics for researcher strategies and interests. These metrics may be useful in improving the system and/or may be of value and interest to researchers and others. They could be sold or otherwise distributed in electronic, print, or other medium, as raw or processed data, or in summary form, such as a newsletter.

The "footprint" optionally showing research trails, as described above with regard to the propositions pane, can work in precisely the same manner in the authorities pane. In the case of the authorities pane, the footprint may mark authorities that a researcher selected for inclusion in the text pane (described below).

In the example embodiment, when the researcher places the pointer over an authority, a contextual menu (not shown in the Figures) appears, offering further research options related to that authority. One menu item, described in the next subsection, causes the research system to enter that authority and its proposition into the text pane. Another causes the research system to draw arrows to and from all the displayed authorities whose associated sources cite, or are cited by, the sources associated with the selected authority. (See below, Step 1400; this feature is shown in the flow chart, FIG. 6, but is not depicted in the Figures.) A third opens additional authorities panes corresponding to ancestor nodes of the node corresponding to the already displayed pane. In these authorities panes, only sources citing the source of the selected authority are shown. This option allows the researcher to see how sources citing the selected authority's source have addressed propositions related to the proposition in question. (See below, Step 1500; this feature is shown in the flow chart, FIG. 6, but is not depicted in the Figures.) The researcher may move as far up the taxonomy as desired with this feature, opening new authorities panes at each level.

Although not depicted in the Figures, the research system also includes a method for viewing authorities that are machine-generated in the manner described below. (See below, final paragraphs of subsection entitled, Creating the Propositions and Authorities Data and Database; note that machine-generated authorities, as discussed here, are not identical with authorities produced by automatic integration, as discussed below (see below, Text Pane) These might differ in some respects from those created directly by human experts and so may be depicted in a separate authorities pane, although they need not be. A researcher might choose to view such authorities, for example, by pressing a button on an authorities screen. The authorities pane might then show authorities likely to provide support for the same proposition for which the authorities previously showing in the pane provide support, but drawn from a larger body of sources. The filtering and sorting preferences could also be maintained, although they could also be changed in the usual manner. Alternatively, or in addition, the research system could sort authorities by the likelihood that they provide support for the selected proposition. In that case, the researcher might have the option, for example, of applying a new Boolean statement as a filter and be shown in the authorities pane an authority produced from every source in the research system database (or a subset of it) of which the Boolean statement is true, in the order of the likelihood that the authority provides support for the selected proposition.

Machine-generated authorities can be represented in the authorities pane in the same manner as their human-created authorities. Alternatively, they can be represented by different or fewer fields of information. Researchers can utilize them in exactly the same ways as human-created authorities, for example, by inserting them into the text pane (as described below). To the extent that the information they contain differs from that contained in the human-created authorities, the functions might differ somewhat. For example, machine-generated authorities might lack explanatory parentheticals (although not necessarily); in that case, they would be inserted into the text pane without a parenthetical.

As described below, machine-generated authorities, like human-created authorities, may be built from and associated with sources that are stored on computers on the researchers' own local networks, on a centralized server of the research system itself (perhaps sources that have not been processed by humans in the manner necessary to create human-created authorities), on servers maintained by vendors of source information, or on any other storage device to which the research system has access.

Text Pane

The text pane (FIGS. 16 & 22) aids researchers in creating written work on the basis of their research. In its most basic function, it is a place for the researcher to collect and organize useful propositions and authorities. However, it functions as much more than a mere collection device; it also aids the researcher in using the research and actually does some of the writing for the researcher. At the researcher's prompting (in the example embodiment by selection of the appropriate item on an authority's contextual menu) the research system enters an authority and its corresponding proposition into the text pane. The proposition is entered in the form of a full sentence (in the example embodiment identical to its "long header"), in language that would be appropriate for use in a formal written document produced by experts in the field (in the example embodiment, as would be appropriate for use in a legal brief or memorandum). The authority follows it in a standard citation format. The research system is capable of using more than one standard format, among which the researcher can select the most appropriate for the document the researcher intends to produce (see below, Step 200: Manage Account or Set User Preferences). The researcher may add propositions and authorities to the text pane throughout the research session by clicking the appropriate link on desired authorities in the authorities pane. The research system enters each authority into the text pane together with the proposition as stated at the top of the column displaying the authority in the authorities pane. Where the researcher selects more than one authority for the same proposition, the proposition is not repeated. In the example embodiment, by default authorities appear in the order in which they are selected, except where the authority's proposition is already in the text pane, in which case the new entry appears immediately after the previously selected authorities for that proposition. Authorities within the text pane may be sorted by various relevant characteristics, including, but not limited to, by date; by source type; and in standardized orders of authorities, such as that of the "Blue Book" or other style manuals.

In the example embodiment, the researcher may also shift the positions of authorities manually within the text pane so as to order them in the most convenient way. Multiple authorities for a single proposition may be reordered and may be moved as a group. The researcher may also remove authorities from the text pane by selecting them and pressing the delete key.

In the example embodiment, the contents of the text pane persists for the whole of a research session (that is, it can be added to, subtracted from, and edited by the researcher, but does not otherwise change its contents). The researcher may follow multiple research paths, collecting authorities and propositions along the way in the text pane.

Although not depicted in the Figures, the research system is also able to use an already existing word processor (for example Microsoft Word) as the text pane itself. (In the example embodiment, this option is available to researchers using the stand-alone client application but not to researchers accessing the research system via a web browser.) If the researcher chooses that option, then the research system modifies the researcher's word processing application, through a plug-in or otherwise. (This modification generally must be made only once, unless a new word processor is to be used.) The researcher can then use all of the word processing functions available in the word processor within the research system, such as to edit or arrange the propositions and authorities, and/or to compose a larger document around the propositions and authorities. When the researcher adds propositions and authorities to the text pane, in that case, the propositions and authorities are actually added to a word processing file in the form of specialized fields, permitting them to be manipulated in specialized ways. For example, the format in which an authority is cited could be changed by right-clicking on the authority and selecting from a dropdown of citation formats. When the researcher is not using the research system, the word processing file would remain available for use within the word processor, and the specialized functions would remain available as well.

Although not shown in the Figures, a researcher who chooses not to use a standard word processing program as the text pane can choose, during or following a research session, to embed the propositions and authorities collected in the text pane in a word processing document external to the research system. In that case (following a modification process similar to that described above), the researcher is given the option of embedding them in a new word processing document or in an already existing word processing document to which the user has access. In either case, once the propositions and authorities are embedded, all the features described in the preceding paragraph become available within the word processing program.

A researcher who chooses not to use a standard word processor as the text pane nonetheless has access to basic word processing features within the text pane. At the end of a research session, a researcher who chooses not to embed the contents of the text pane in a word processing document may save the text pane for later use, print it, e-mail its contents to an e-mail address, or simply paste the contents into a word processing document.

Although not depicted in the Figures, the research system also includes a function for integrating a researcher's own work into the research system itself. (Although not necessarily a function of the Text Pane, in the example embodiment this function will often be initiated from within the Text Pane and is therefore discussed here.) This can be accomplished either automatically or manually. In the example embodiment, if the researcher is using a standard word processor as the text pane, then the automatic integration function may be activated by a button within the text pane; otherwise it may be activated by a button that appears if the researcher chooses the option of embedding propositions and authorities into a word processing document, as described above. It may also be activated by a button within the word processor itself, if the document that is open in the word processor contains one or more embedded authorities. However it is activated, the automatic integration function makes the researcher's document into a source within the research system and, for each proposition embedded in the document, creates an authority representing the expression of that proposition. In the example embodiment, the researcher's name is, by default, recorded as the author of the source, the date of integration as the date of the source, while this information and other information about the source can also be entered manually, but need not be. (Note that automatic integration is an aspect of the research system separate from machine-generated authorities, as discussed above and below. (See above, Authorities Pane, and below, Creating the Propositions and Authorities Data and Database.).)

The result of automatic integration is that, without costing the researcher almost any effort, the researcher's work will appear whenever a subsequent researcher (or the same researcher in a subsequent session) is looking for support for any of the propositions stated in that document. In the example embodiment, by default, the integrated source and authorities will be accessible only to the researchers within the local network of the document's author. Optionally, the researcher may choose access that is more expansive (for example, to all researchers, or to researchers on a list of networks) or less expansive (for example, only to the creator, or only to individuals to whom the creator chooses to grant access). The research system integrates with any file management and/or document management systems operating on the researcher's computer and/or network, so that the research system is able to locate the document when necessary, and so that researchers who are entitled to access the document can use it both through the research system and in the other ways in which they would use it otherwise.

Manual integration allows the researcher to integrate sources and/or authorities manually. In the example embodiment, this can be done either from within the research system, or while using a word processing program that has been modified for use by the system as discussed above. In either case, the researcher may select a document to integrate as a source and optionally fill out a form to describe relevant information about the source, including how broadly to allow access to the source by other researchers (as described above with respect to automatic integration.) The new source then functions exactly as any other source in the research system. The researcher may also choose to allow the research system to create machine-generated authorities connecting the source to propositions, as discussed above and below (see above, Authorities Pane, and below, Creating the Propositions and Authorities Data and Database), or may create authorities manually. In the latter case, the research system presents the researcher with forms to fill out, and on the basis of the response fills the authority with the relevant information. The option of creating authorities manually is also available from within the research system even when the source with which the authority is associated is not itself stored within the research system or otherwise accessible to users of the research system.

Creating the Propositions and Authorities Data and Database

The data contained in the research system's database (as described above, Organization of Information in the Research System) may be abstracted from source documents containing knowledge within a field. Because the example embodiment described here implements the research system as a system for legal research, the source documents could be sources of legal authority, such as case law, statutes, regulations, treatises, and articles in law journals and other legal publications. Many of these sources, although written in continuous prose, contain elements of the hierarchies that the experts rely on in structuring the propositions taxonomy. Relationships between parent and child nodes in the taxonomy are all of those relationships that define the structure of legal thought as expressed in the organization of legal opinions, treatises and other legal authorities. Commonly the child represents a narrowing, or more specific application of, the parent. In other instances, the child is a consequence of, or an exception to, the parent. Other relationships are also permissible.

In order to create authorities, a universe of source documents may be decided upon. Every expression of a proposition in any of these sources may be abstracted to form an authority. When an expert comes upon a statement of law not already represented as a proposition, the expert may abstract both a proposition and an associated authority.

Experts may build the propositions and authorities by entering data into a database. One option is to use a relational database engine, such as, for example, MySQL or PostgreSQL. The data could also be organized and stored in XML format. (In XML format, some of the authorities data could be stored together with the full text of the source documents with which they are associated.)

Most of the information about the propositions may be contained in tables containing the following columns (from which are excluded columns whose only purpose is to serve as a primary key):

"nodes," identifying nodes with their headers, containing the following columns:
    short_version_header
    long_version_header "parent_child_nodes," identifying relationships between nodes and their parent nodes, containing the following columns:
    node_id (primary key of a nodes row)
    parent (primary key of a nodes row); (note that recording each node's parent is a method of storing a hierarchical structure, but not the only such method)
    type_of_relation (e.g., whether a child is an exception to its parent)

"crossreferences," containing the following columns:
    node_ id (primary key of a nodes row)
    cross_ref (primary key of a nodes row)

Human experts may create authorities by entering information about particular sources and propositions into another set of tables. Most of the information about authorities can be contained in the following tables of authorities and source documents:

"authorities," containing the following columns:
    name
    answer (whether positive, negative or uncertain authority)
    direction (whether decision as to proposition favors case's moving forward)
    parenthetical
    signal (indicating the strength of the authority for the proposition)
    source_id (primary key of a sources row)
    posture (if applicable)
    body_of law
    node_id (primary key of a nodes row)

"sources," containing the following columns:
    title (e.g., name of court or treatise)
    type (e.g., court or treatise)
    date "source_publications" (linking source documents to one or more places published), containing the following columns:
    source_id (primary key of a sources row)
    publication_id (primary key of a publications row)
    volume
    first page "source_pin_cites," containing the following columns:
    source_publication_id (primary key of a source_publications row)
    pin_cite "publications," containing the following columns:
    name
    type
    abbreviation Researcher data may be contained in separate tables not described here. Some researcher data may refer to propositions and authorities data in order to provide "footprint" references (see above) and for the neural networking functions described above.

Images may be contained in separate data structures and referred to in separate tables not described above. It will be clear to someone of ordinary skill in the art how to incorporate images as described above (see above, Principal Components of the Research System's User Interface).

As new sources are incorporated into an implementation of the research system (as, for example, new cases are decided), the human experts abstract propositions and authorities from them, as appropriate, in the same manner as when constructing the database in the first instance.

While propositions and some authorities are typically created by human experts, the research system also includes a method for producing machine-generated authorities. Machine-generated authorities are produced by an automated process and are associated with sources within a central database of the research system or to which the research system has access at the time of generation. The process relies on existing text-mining and other information-processing techniques, such as, for example those described in U.S. Patent Application Pub. No. 2007/0078889, incorporated herein by reference in its entirety, and is essentially one of mimicking the work of the human experts who have created authorities up until the point of machine generation. For example, there may be a body of sources that the human experts have processed in order to create all the authorities that appropriately connect the existing propositions with those sources. For ease of description, call that body of sources "body A." There may be another body of sources that may contain expressions of the existing propositions as well but that has not been processed by the experts. Call that body "body B." In order to produce machine-generated sources, the research system may, for example, look for characteristics that tend to distinguish, as to each existing proposition, the sources or portions of sources in body A to which existing authorities for the proposition refer (for example, an authority may contain information identifying a particular paragraph of a particular source as supporting a particular proposition) from the sources or portions of sources in body A for which there is no existing authority for the proposition. These characteristics may be textual (for example, the appearance of certain words or phrases) or may relate to other types of information (for example, if the field of knowledge is law, citations to particular cases, which might not be stored merely as text). Having processed body A in this manner, the research system then applies the information it has gathered to body B, scoring sources or portions of sources for the likelihood that they provide support for each of the existing propositions. Moreover, the same techniques may be applied to identify the likelihood that sources or portions of sources exhibit other characteristics that the experts have stored within the authorities associated with body A sources (for example, the likelihood that the issue was decided on a motion to dismiss). The research system uses all of this information to produce authorities associated with body B sources.

Body A and body B sources may both be stored in any place to which the research system has access. The research system may interface with document management systems installed on researchers' computers or elsewhere in order to increase its access to information. Machine-generated authorities, therefore, may be produced on the basis of information within a centralized database controlled by the research system, on researchers' computers or networks of computers, or elsewhere. Researchers may choose to produce machine-generated authorities of documents on their own servers in order to find information they need in their own documents. Access levels can be set so that those who are not entitled to access to those documents will also not have access to them or to associated authorities.

In the example embodiment, machine-generated authorities are updated frequently, on the basis of additions and changes by the human experts, as well as by machine learning techniques based on choices made by researchers. In the former instance, for example, new sources may be introduced, thus expanding the information in body A, while the experts may create new propositions or add new authorities that are associated with existing propositions. In the latter instance, for example, whenever a researcher selects or rejects a particular computer-generated authority to be included in the text pane, the researcher implicitly states a view as to the usefulness of that authority as to the proposition in question, under the other applicable conditions of the researcher's session (for example, if the field is law, perhaps within a certain jurisdiction that the researcher has selected as a filter). By processing this information in the aggregate (subject to strict privacy protections) and applying machine learning techniques, such as neural networking, the research system continually recalibrates the machine-generated authorities, as to the likelihood that each supports the proposition with which it is associated, and as well as to its other characteristics. In both these ways, the machine-generated authorities are continually improved.

Steps in a Research Session

As an example, the following subsections describe the major steps in a research session using the example embodiment of the research system (and a set of subsequent optional step by which the research system can follow up with the researcher as to a closed research session). The numbered Steps correspond to the numbered items in FIGS. 1-7. The basic structure of the research system, as described above, is not described again here. Many of the features described above are also omitted here.

Step 100: Input User Identification and Password

In Step 100, the research system opens by displaying a dialogue box (not shown), requesting user identification and password. The same dialogue box includes a space in which the researcher may enter a number or term to identify the particular client and/or matter for which the research session is undertaken, if any. It also has a button that the researcher can press to sign up for a new account.

If the researcher chooses to sign up for a new account, then the system displays a new window in which the researcher may enter identifying information and choose a user identification and password. Thereafter the research system shows the user identification and password window again and awaits a response from the researcher.

If the researcher enters an identification and password, but the combination is not recognized, then the dialogue box displays a notification to the researcher that the combination was not recognized and prompts the researcher to try again.

If the researcher enters an identification and password, and the combination is recognized, then the system proceeds to Step 110.

Step 110: Manage Account/Set Preferences or Begin Research?

In Step 110, the research system displays a dialogue box (not shown), requesting that the researcher choose either, on the one hand, to manage the researcher's account and/or set preferences, or on the other, to input parameters of a research session. If the researcher chooses the former the research system moves to Step 200; if the latter, to Step 300.

Step 200: Manage Account and/or Set Preferences

In Step 200, the research system displays a window (not shown) showing the current account information and user preferences and allowing the researcher to make changes to that information and those preferences. Account information includes personal identifying information and, if the client is a paying customer, payment information, such as a credit card number. User preferences may include, but are not limited to, the following:

the researcher's area or areas of specialty, if any, the main jurisdiction or jurisdictions of the researcher's practice, if any, whether the researcher's research trails should be made available online to other researchers within the researcher's network, as described above, whether the research system should display available prior research trails of others on the researcher's network, as described above, preferred appearance of propositions and authorities panes, including image schemes, as described above, preferred form of citation (for example, Blue Book form), and display of commentary links in authorities pane, as described above.

The researcher may also amend preferences at any point throughout the research session by a button on the propositions pane (see Step 710), or by moving the cursor over the item to be customized in another window (not shown) to bring up a contextual menu of customization options. New preferences take effect immediately.

The research system waits for the researcher to press a "submit" button and then makes the requested changes, if any, to the account settings and user preferences.

The research system moves to Step 210.

Step 210: Session in Progress?

In Step 210, the research system checks whether the researcher is already in the midst of an active research session. If so, then the research system moves to Step 710, otherwise to Step 220.

Step 220: Conduct Research?

In Step 220, the research system displays a dialog box prompting the researcher to choose either to begin a research session or to exit from the system. Upon receiving the researcher's choice to begin a research session, the research system moves to Step 300. Upon receiving the user's choice to exit from the system, the research system moves to Step 1600.

Step 300: Input Parameters of Research Session

In Step 300, the research system displays a dialog box prompting the researcher to enter parameters for the current research session. The research system prompts the researcher to input these parameters by checking boxes beside the desired criteria. In checking these boxes, the researcher may choose to control the display of authorities in the authorities pane (as described above) by choosing to filter or sort results by any combination of various criteria, including, but not limited to types of source (for example, case law, statutes, or secondary source), jurisdictions, bodies of substantive law (for example, the law of one or more particular states, regardless of whether the source cited as an authority is from that state), date of source (for example, issuance date of a court decision), and procedural posture (for example, case law stating the proposition at issue in deciding a motion for summary judgment). Filtering limits the authorities displayed to the selected criteria, while sorting controls the organization of the display. The user may also create custom filters by entering Boolean statements setting conditions on which authorities are displayed. These filters may apply to a variety of criteria. For example, the researcher may limit displayed authorities to those authorities whose associated source meets certain conditions, such as containing certain words or citing certain cases; to those authorities containing comments from other researchers (see discussion of comments above, Authorities Pane) or comments from other researchers that contain certain words; or to any combination of criteria. Custom sorting methods are also available. For example, the researcher may choose to sort by how many times a particular word appears in the source associated with the authority.

Figure 8:
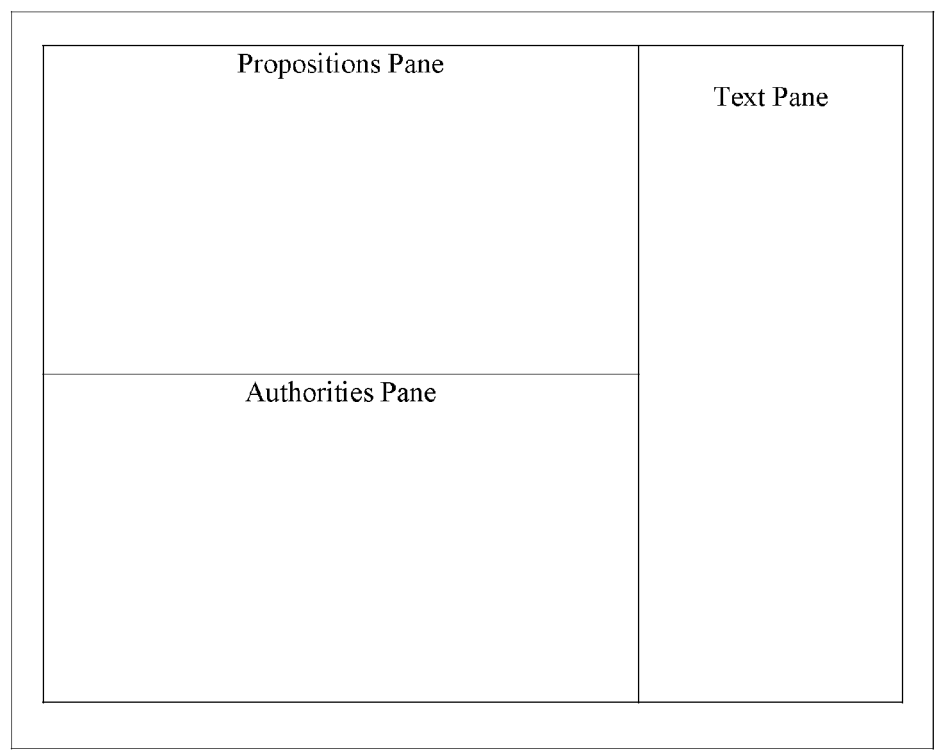
FIG. 8 shows a configuration of the panes of the user interface (described below).

Following the input of parameters, the research system displays the research window, consisting of the propositions pane, the authorities pane, and the text pane (as described above). FIG. 8 shows the default configuration of the panes within the window (but without showing the content of the panes).

The research system moves to Step 310.

Step 310: How to Conduct Research?

In Step 310 the research system prompts the user to decide among three ways to conduct research: 1) by navigating from the highest level nodes in the propositions pane (causing the research system to move to Step 400), by continuing a prior research session (causing the research system to move to Step 500), or by conducting a search for a node in the propositions pane (causing the research system to move to Step 600).

Step 400: Display Highest-Level Nodes in Propositions Pane

Figure 9:
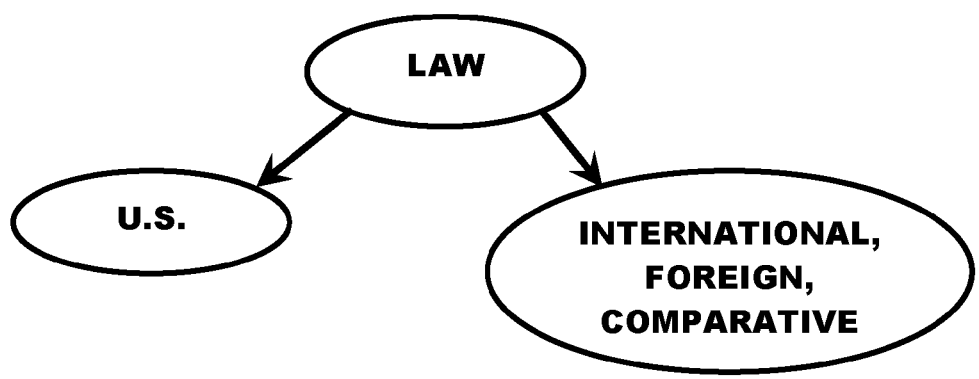
Figure 10:
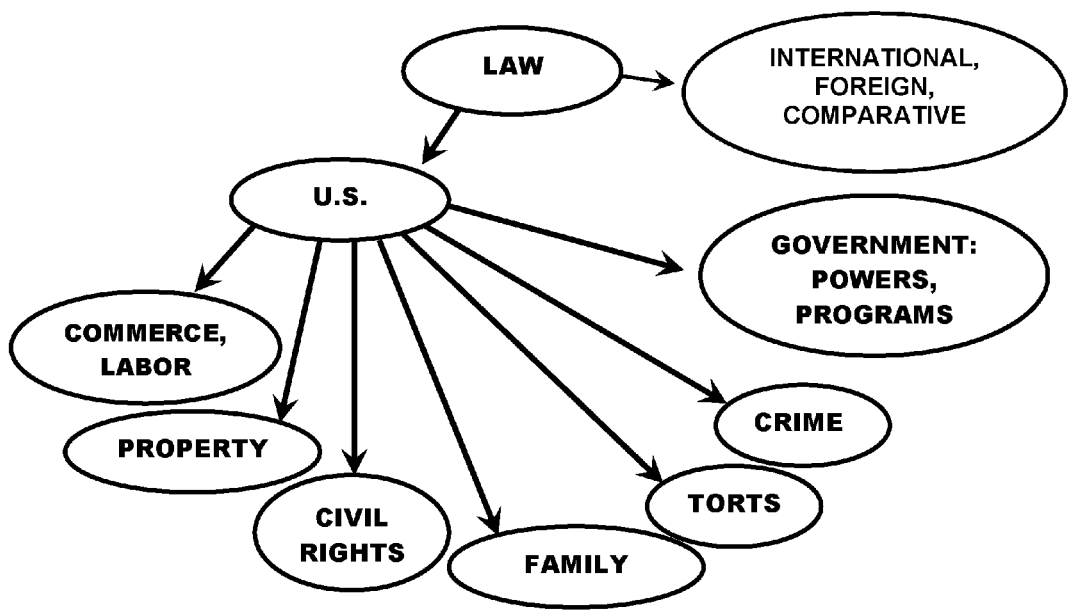

In Step 400, the research system displays in the propositions pane as nodes the general area of research, with the highest-level categories of research below it. (FIG. 9.) Propositions are displayed hierarchically. (Regarding the organization of the propositions, see above, Organization of Information in the Research System.)

If the researcher clicks on a node, then the research system moves to Step 700.

Step 500: Continue Prior Research Trail

In Step 500, the research system displays a window (not shown) listing prior research sessions, each case displaying the whole path of the research session. The researcher may then select any point on any one of these prior sessions by clicking it. Thereupon, the propositions pane displays the nodes that were shown at the point in the prior research session selected by the researcher.

If the researcher clicks on a node, then the research system moves on to Step 700.

Step 600: Conduct Search

In Step 600, the research system displays a search box in which the researcher may enter a category in which to search. (This feature is not depicted in the Figures.) The research system then compares the researcher's search term to a thesaurus of terms and, on that basis, proposes a selection of nodes likely to be of interest to the researcher. Alternatively, the researcher may enter a Boolean statement requesting a list of nodes for which the statement is true. In either case, the researcher may then select any of the nodes on the list returned by clicking it. Thereupon, the propositions pane displays the node selected and its children.

If the researcher clicks on a node, then the research system moves on to Step 700.

Step 700: Display Refreshed Propositions and Authorities Panes

In Step 700, the research system displays in the propositions pane the children of the most recently selected node. (For example, if the propositions pane previously showed the propositions displayed in FIG. 9, and the researcher clicked on the word "U.S.," then the propositions pane might show the propositions displayed in FIG. 10.)

Siblings of the selected nodes (that is, nodes that the researcher decided not to select) are displayed in a light gray tone. This highlights for the researcher the research path traveled up to that point.

If the selected node is a sibling of a node previously selected, the research system restores the selected node's original color and displays its children.

If the researcher selected the option described in sub-step 2 of Step 710, then the research system refreshes the propositions pane in the way described in that Step. (For example, if the propositions pane previously showed the propositions displayed in FIG. 10, and the researcher chose option 2 after holding the cursor over the word "Torts," then the propositions pane might show the propositions displayed in FIG. 11.)

If the researcher selected the option described in sub-step 3 of Step 710, then the research system refreshes the propositions pane in the way described in that Step. (For example, if the propositions pane previously showed the propositions displayed in FIG. 17, and the researcher chose option 3 after holding the cursor over the words "Types of Activities," then the propositions pane might show the propositions displayed in FIG. 18.)

If the researcher selected the option described in sub-step 4 of Step 710 then the refreshed propositions pane is a new propositions pane, with a new associated authorities pane attached. (For example, if the propositions pane previously showed the propositions displayed in FIG. 10, and the researcher chose option 4 after holding the cursor over the word "Torts," then the propositions pane might show a new propositions pane displaying the propositions displayed in FIG. 11.)

If the selected node is a proposition, the research system displays in the authorities pane the authorities corresponding to that proposition, sorted and filtered according to the researcher's preferences. (For example, if the propositions pane previously showed the propositions displayed in FIG. 14, and the researcher selected the words "Can Support Strict Liability?," then the authorities pane might show the authorities displayed in FIG. 15.)

The text pane remains unchanged in this step.

The research system moves to Step 710.

Step 710: What Selection from Propositions, Authorities, or Text Pane?

In Step 710, the research system awaits a selection from the user from among the options available in the three main panes, which may include (but are not be limited to) the following:

The researcher may click on a node in the propositions pane, in which case the research system moves to Step 700.

Figure 11:
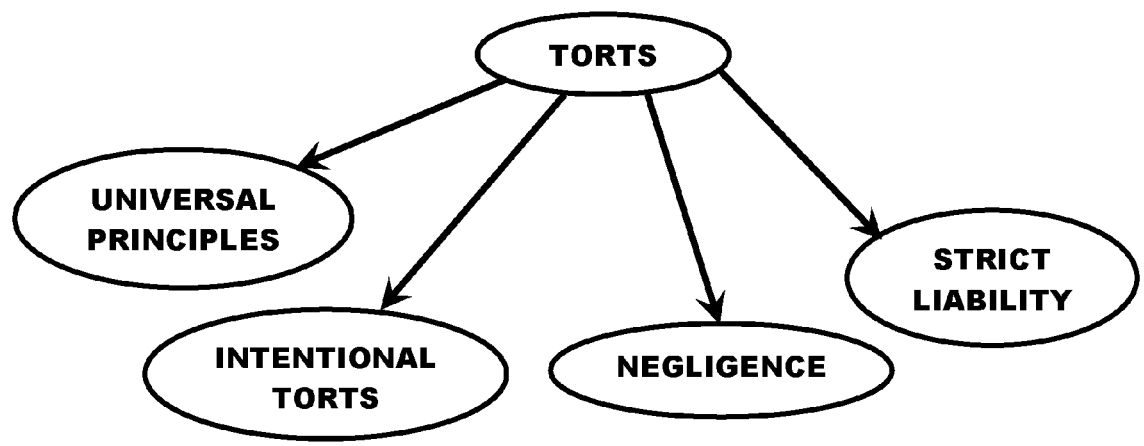
Figure 12:
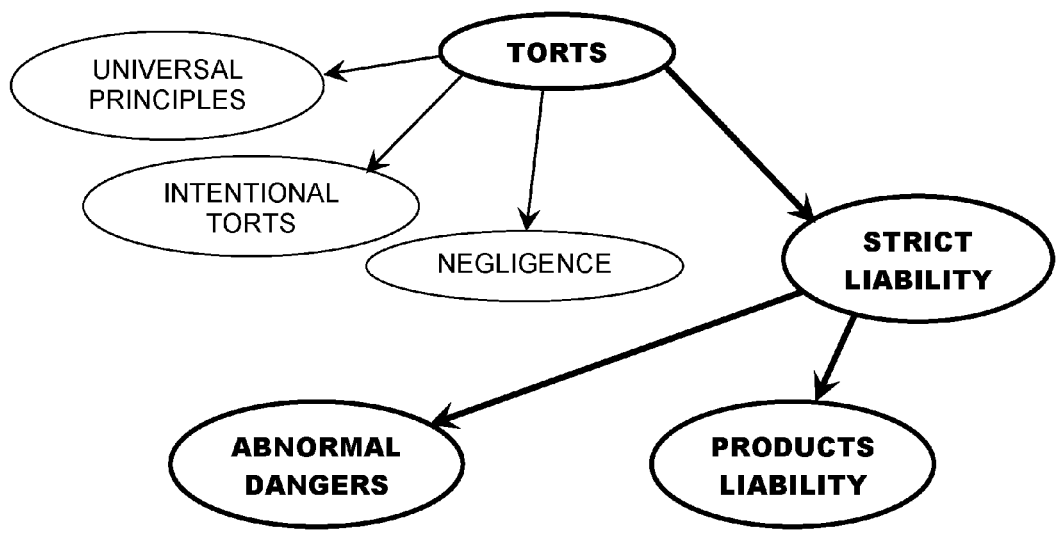
Figure 13:
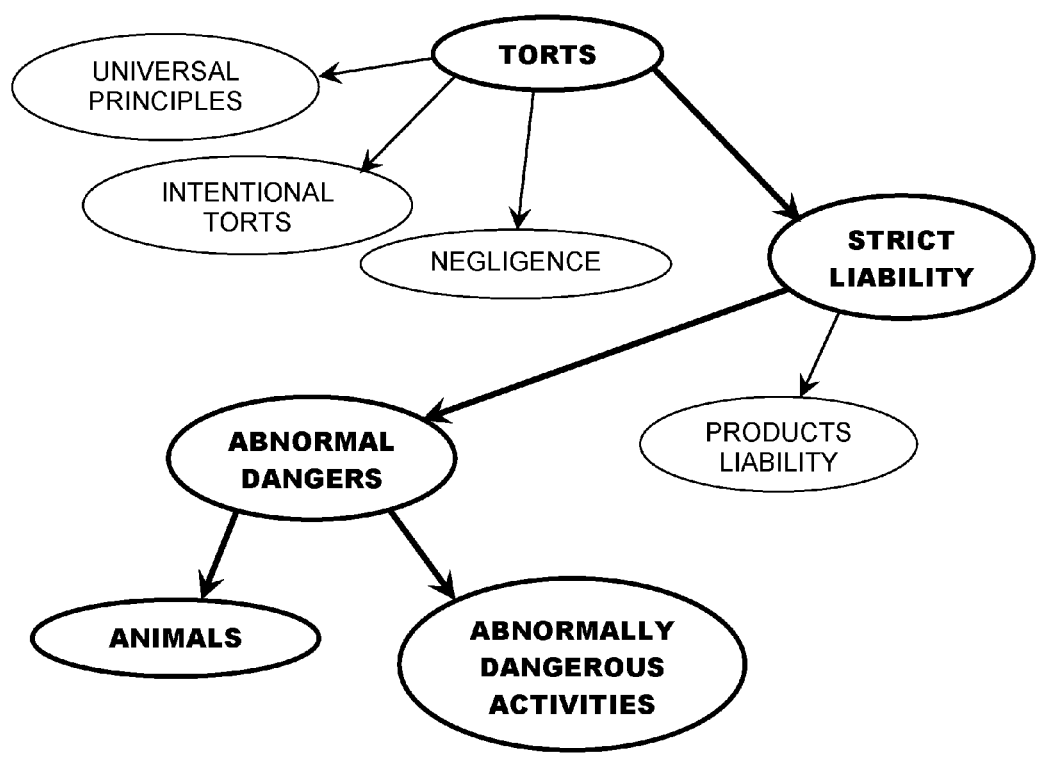
Figure 14:
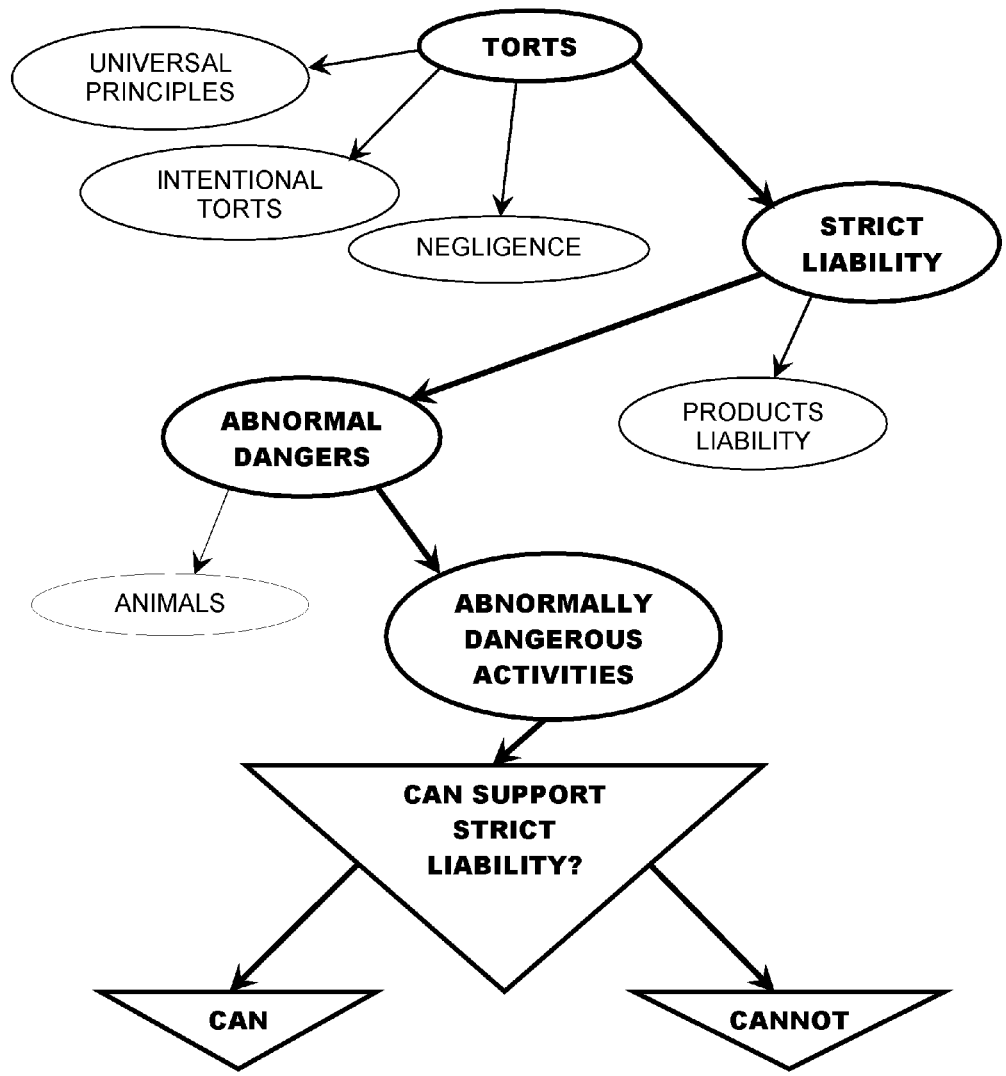
Figure 17:
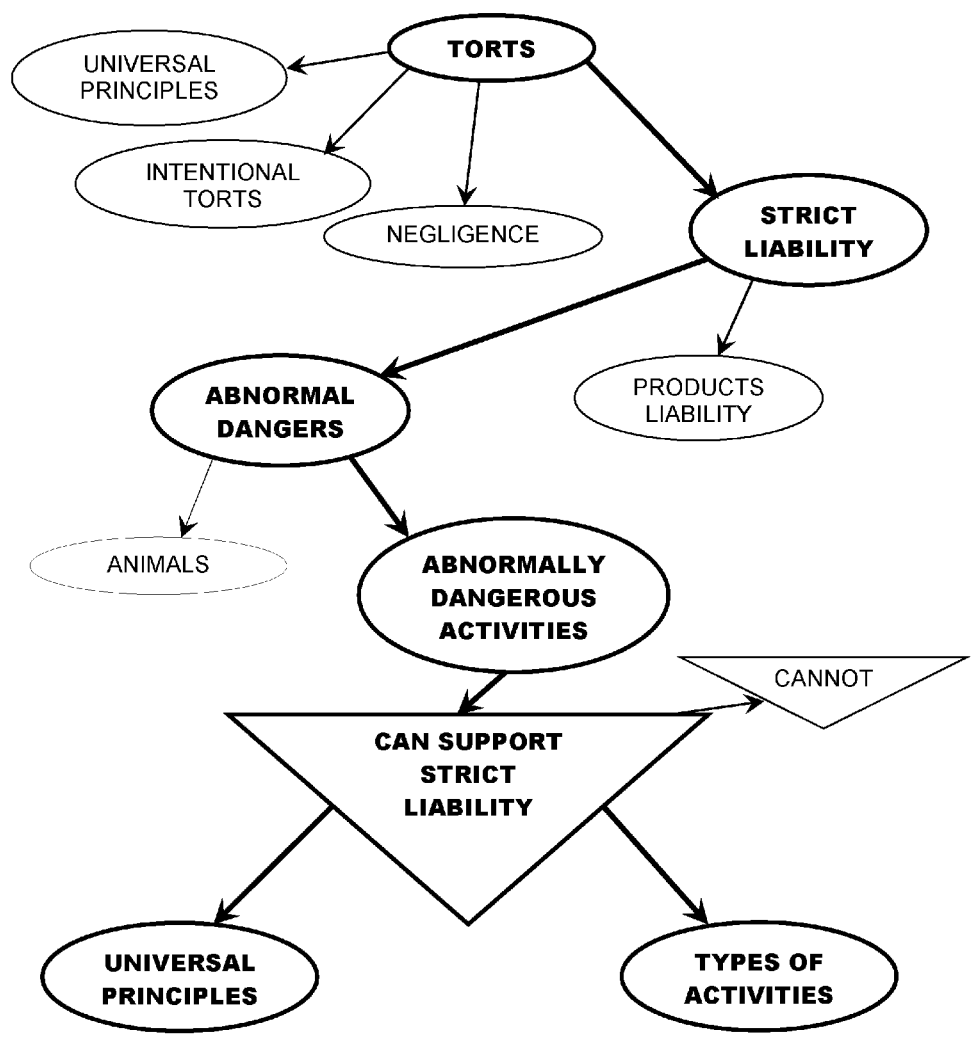
Figure 18:
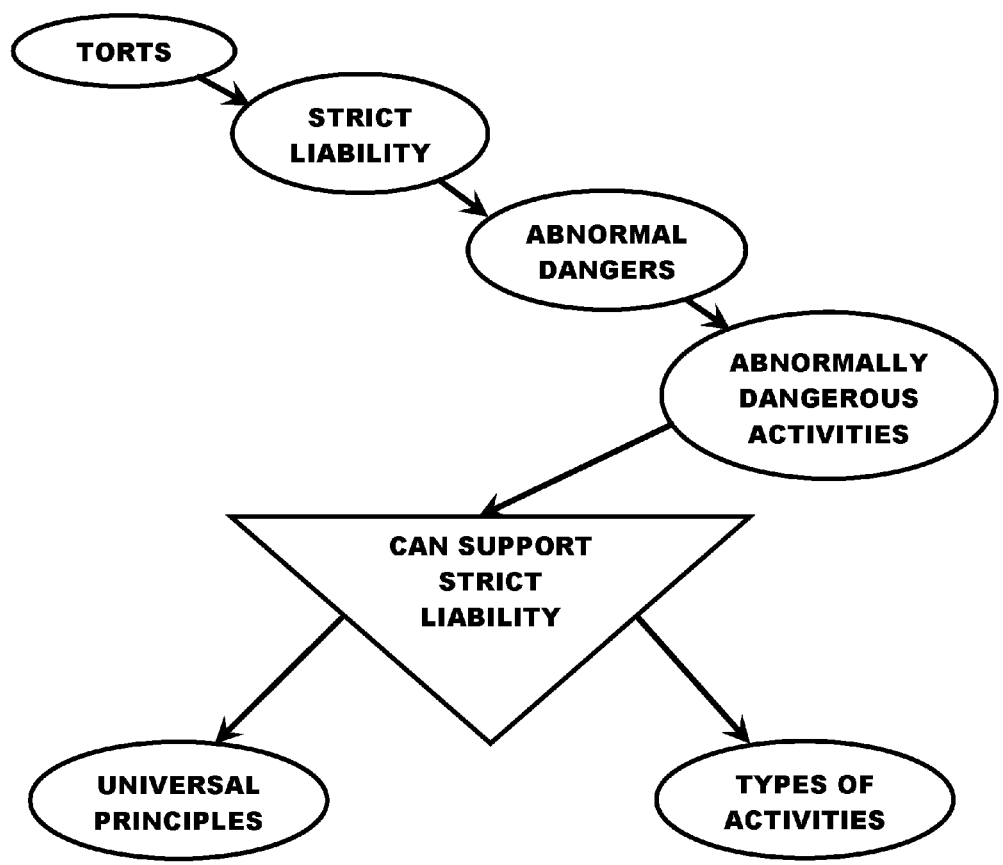
Figure 19:
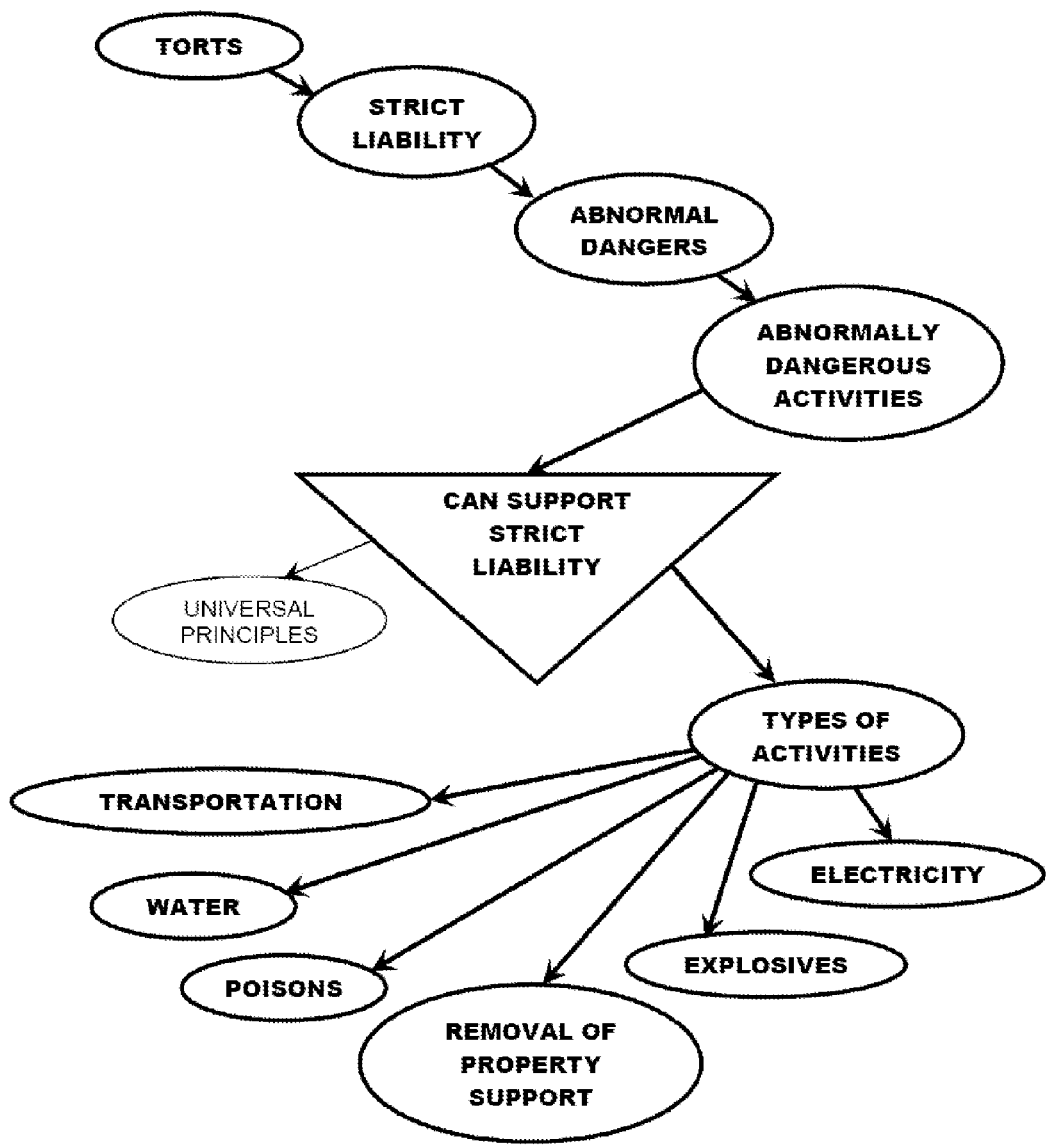
Figure 20:
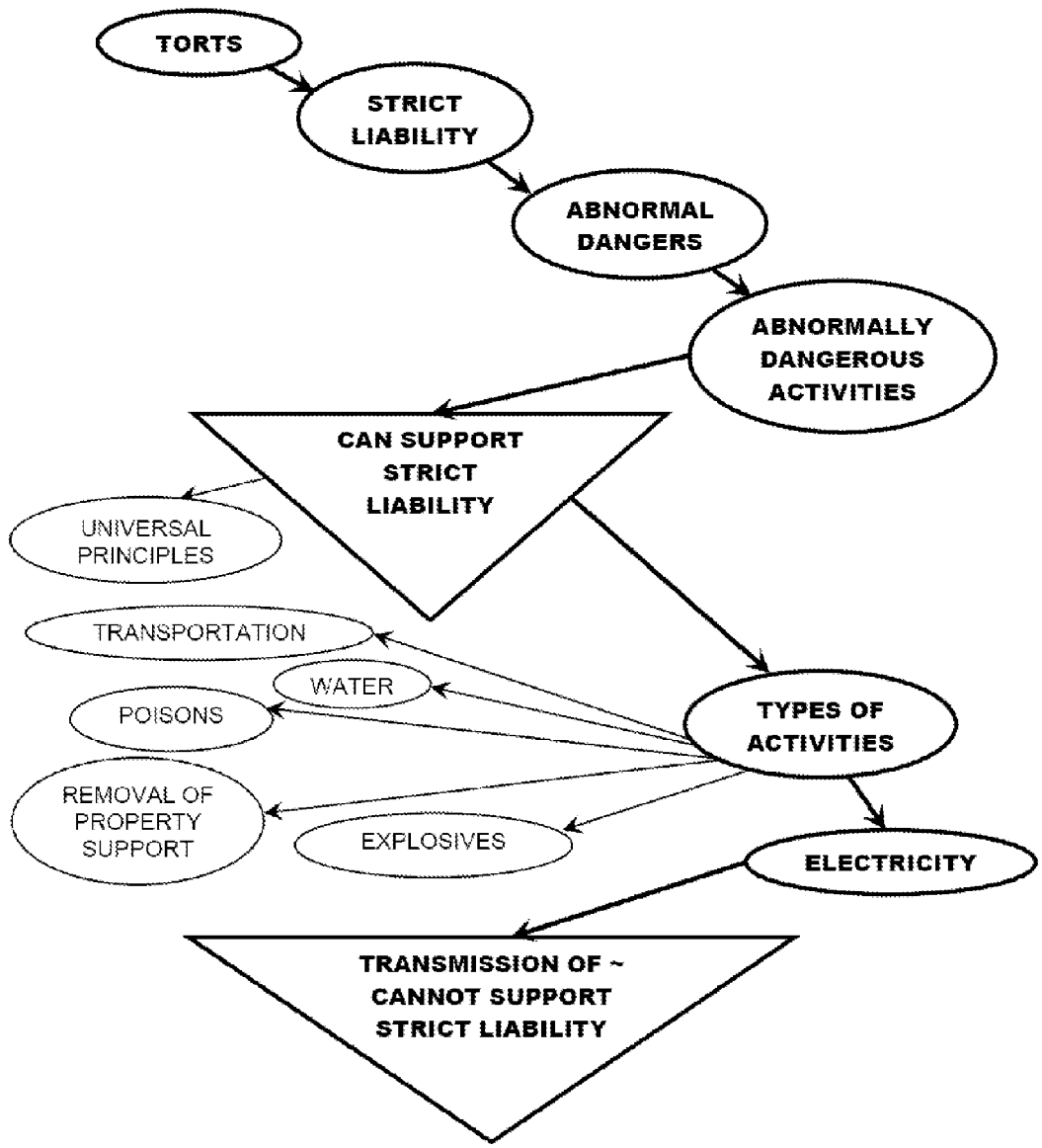

If the researcher holds the cursor over a node in the propositions pane, then the research system displays a contextual menu (not shown) offering several choices. One option is to refresh the propositions pane with the selected node at the top (FIG. 11). If the researcher selects this option the research system moves to Step 700.

From the same contextual menu as described in sub-step 2, the researcher may select an option to remove all nodes that are not direct ancestors of the selected node (FIG. 18), allowing the researcher a view of the path traveled, uncluttered by unselected nodes. If the researcher selects this option the research system moves to Step 700.

From the same contextual menu as described in sub-step 2, the researcher may select an option to open the selected node at the top of a new proposition pane in a new window, which allows the researcher to follow alternative paths in separate windows (represented by FIG. 11, the same Figure representing sub-step 2, since the Figures do not show whether it is a new window). If the researcher selects this option the research system moves to Step 700.

The researcher may click a button (not shown) on the propositions pane to manage account or set preferences, in which case the research system moves to Step 200.

The researcher may click a button (not shown) on the propositions pane to begin a new research trail, in which case the research system moves to Step 300.

The researcher may click on a button (not shown) on the propositions pane to end the research session, in which case the research system moves to Step 1600.

The researcher may click on an authority in the authorities pane to display the full source, in which case the research system moves to Step 900.

If the researcher holds the cursor over the title of an authority in the authorities pane, then the research system displays a contextual menu (not shown) offering several choices. Among these is one to add the selected authority to the text pane. If the researcher selects this option the research system moves to Step 800.

From the same contextual menu as described in sub-step 9, the researcher may select an option to show inter-source citations of the selected authority in the already displayed authorities pane. If the researcher selects this option the research system moves to Step 1400.

From the same contextual menu as described in sub-step 9, the researcher may select an option to show new authorities panes associated with ancestors of the selected node, with the new panes showing only authorities of sources citing the source of the selected authority. If the researcher selects this option the research system moves to Step 1500.

By selecting a button in the text pane (not shown) the researcher may choose to embed the contents of the text pane in a document. If the researcher selects this option the research system moves to Step 1100.

By selecting a button in the text pane (not shown) the researcher may choose to print or save the text pane, or to export its contents to the clipboard. If the researcher selects this option the research system moves to Step 1300.

Step 800: Add Authority with Proposition to Text Pane

In Step 800, the research system adds the selected authority, together with its associated proposition, to the text pane, as described above. (See Authorities Pane & Text Pane.)

The research system moves to Step 710.

Step 900: Display Full Source of Authority in New Window

In Step 900, the selected source is displayed in a new window (not shown), which opens to the portion of the source cited by the authority. The researcher may scroll through the text or run searches.

The research system then moves to Step 910.

Step 910: Print and/or Save?

In Step 910, the research system awaits the researcher's decision as to whether to print the displayed source and/or save the displayed source to a local file. More precisely, the window displaying the source may include a print button, a save button, and a button for closing the window. If the researcher clicks one of the first two buttons, the research system moves to Step 1000; if the researcher clicks the close button, then the research system closes the window. Step 710 describes what occurs if, rather than selecting any of these options, the researcher chooses an option from one of the three main panes—propositions, authorities, or text pane. The window displaying the source may remain open in that case, with all three options available, unless and until the researcher clicks the close button.

Step 1000: Print Source or Save to File

In Step 1000, the research system prints the source to the researcher's printer (if the print option was selected) or saves it to a computer file in a convenient file format (if the save option was selected).

The research system moves to Step 710 (although the options described in Step 910 also remain available).

Step 1100: Embed Contents of Text Pane in a Document

In Step 1100, the research system employs a powerful tool for incorporating the contents of the text pane into a document external to the research system. When this option is chosen, the research system embeds the text pane contents as "live" propositions and authorities. The embedded text typically takes the form of a field in a word processing document and may be moved and manipulated by the researcher. The researcher may thus incorporate these live propositions and authorities into briefs, memoranda, or other work product. Two benefits are created, as described below. (See Step 1200 & Step 1700.) Also in Step 1100, the research system displays a dialog box prompting the researcher to choose whether to receive alerts upon relevant changes in the law, either by e-mail or in the document in which the text pane contents have been embedded. (See step 1700.)

The research system moves to Step 1110.

Step 1110: Incorporate Document?

In Step 1110, the research system prompts the researcher to choose whether the research system should incorporate the document containing the embedded propositions and/or authorities as a source and build new authorities from it to incorporate into the research system, as described above (see Text Pane). If the researcher chooses to incorporate, then the research system moves to Step 1200. Otherwise the research system moves to Step 710.

Step 1200: Incorporate Authority/-ies from Document into Research System

In Step 1200, the research system employs a tool whereby documents containing live propositions and authorities are automatically integrated into the research system itself for those with access to the researcher's local network. The document in this case becomes a source in the research system containing an authority (or authorities) associated with the proposition (or propositions) that the authority (or authorities) supports (or support). Subsequent researchers at the office can learn of the preexisting work product when they travel relevant research trails.

The research system moves to Step 710.

Step 1300: Print, Save, or Export Text Pane Contents via Clipboard

In Step 1300, the research system prints the contents of the text pane (if the researcher chose the print button on the text pane); saves the contents of the text pane in order to return to it during a subsequent research session (if the researcher chose the save button); or copies the contents of the text pane to the clipboard, thereby allowing the user to export it to other applications, such as a word processor (if the user clicks the export to clipboard option). The save option allows multiple text panes to be saved, any of which may be reopened during any subsequent research session.

The research system moves to Step 710.

Step 1400: Show Connections Between Selected Authority and Others in Pane

In Step 1400, as described above (see Authorities Pane), the research system adds to the open authorities pane arrows connecting the selected authority with other displayed authorities whose sources cite the source of the selected authority.

The research system moves to Step 710.

Step 1500: Open Panes Showing Citing Ancestors

In Step 1500, as described above (see Authorities Pane), the research system opens additional authorities panes corresponding to ancestor nodes of the node corresponding to the open pane. In these panes, only sources citing the source of the selected authority are shown. The researcher may move as far up the taxonomy as desired, opening new authorities panes at each level.

The research system moves to Step 710.

Step 1600: End Session

In Step 1610, the research system logs the researcher off the research system.

The research system moves to Step 1610.

Step 1610: Authorities Have Been Embedded?

In Step 1610, the research system checks whether the researcher has embedded one or more authorities in one or more documents (see Step 1100). If not, the process ends. If so, the research system moves to Step 1620.

Step 1620: Researcher Requested Updates?

In Step 1620, the research system checks whether the researcher chose (in Step 1100) to receive alerts when the database has changed with regard to the propositions and/or authorities that the researcher embedded in one or more documents. If not, the process ends. If so, the research system moves to Step 1630.

Step 1630: Relevant Propositions and/or Authorities Changed?

In Step 1630, the research system checks daily whether the database has changed with regard to the propositions and/or authorities that the researcher embedded in one or more documents. If not, the process ends. If so, the research system moves to Step 1700.

Step 1700: Provide Alerts by E-mail and/or in Document

In Step 1700, the research system alerts the researcher that the database has changed with regard to the propositions and/or authorities that the researcher embedded in one or more documents. The research system provides the alert either by e-mail or in the document or documents containing live propositions and authorities, or by both methods, depending on the choice that the researcher made in Step 1100.

The research system moves to Step 1630. (Steps 1630 and 1700 repeat daily unless and until the researcher, having logged on to the research system again, chooses no longer to receive alerts.)

The invention claimed is:

1. A method for organizing information in a database and displaying portions of the information during research using a processor, comprising:
   defining a proposition comprising a generic expression of an idea wherein the idea can be expressed in a plurality of forms and wherein the proposition includes a scientific theory or hypothesis;
   identifying a first expression of the proposition as expressed by a first individual or entity and a second expression of the proposition as expressed by a second individual or entity, wherein the first expression of the proposition comprising a first set of characteristics and the second expression of the proposition comprising a second set of characteristics and wherein the first expression and the second expression are each a source of information providing support for the proposition;
   using the processor to arrange the proposition hierarchically within the database, wherein the proposition is represented by a first node within the database, wherein subordinate to the first node is a second node, and the generic expression of the idea does not define a category;
   using the processor to associate the proposition with the first expression of the proposition and with the second expression of the proposition using the first set of characteristics and the second set of characteristics;
   separating a plurality of propositions from a corresponding plurality of expressions of the propositions, wherein the arrangement of each of the plurality of propositions hierarchically within the database creates a taxonomy having a plurality of levels; and
   displaying, in at least one portion of a display, the proposition, a visual representation of a conceptual relationship between nodes of the database, and information about at least one expression of the proposition.

2. The method according to claim 1, wherein the second set of characteristics is an authority.

3. The method according to claim 1, wherein the first set of characteristics is an authority.

4. The method according to claim 1, wherein each level in the taxonomy includes at least one node.

5. The method according to claim 4, wherein each node is a proposition.

6. The method according to claim 4, wherein each node that is not a top level node includes a subdivision of information from a node at the next higher level in the taxonomy.

7. The method according to claim 4, wherein each node that is not a top level node includes a subdivision of information from a node at the next higher level in the taxonomy.

8. The method according to claim 1, wherein each level in the taxonomy includes at least one element.

9. The method according to claim 8, wherein each element is at least one of a category and proposition, and wherein each at least one category and proposition is represented by a plurality of words.

10. The method according to claim 9, wherein the plurality of words does not exceed five words.

11. The method according to claim 1, wherein the first expression of the proposition provides support for the proposition.

12. The method according to claim 11, wherein the support is classified within the first set of characteristics relating to the expression of the proposition as either positive or negative.

13. The method according to claim 11, wherein the support is classified within the first set of characteristics relating to the expression of the proposition as either positive, negative or uncertain.

14. The method according to claim 11, wherein the support is uncertain.

15. The method according to claim 1, wherein the first expression of the proposition is classified according to predetermined criteria within the first set of characteristics.

16. A method for organizing information in a database and displaying portions of the information during research using a processor, comprising:
   defining a proposition, wherein the proposition comprising a generic expression of an idea wherein the idea can be expressed in a plurality of forms;
   identifying a first expression of the proposition as expressed by a first individual or entity and a second expression of the proposition as expressed by a second individual or entity, wherein the first expression of the proposition comprising a first set of characteristics and the second expression of the proposition comprising a second set of characteristics and wherein the first expression and the second expression are each a source of information providing support for the proposition;
   using the processor to arrange the proposition hierarchically within the database, wherein the proposition is represented by a first node within the database, wherein superior to the first node is a second node, and the generic expression of the idea does not define a category;
   using the processor to associate the proposition with the first expression of the proposition and with the second expression of the proposition using the first set of characteristics and the second set of characteristics;

separating a plurality of propositions from a corresponding plurality of expressions of the propositions, wherein the arrangement of each of the plurality of propositions hierarchically within the database creates a taxonomy having a plurality of levels; and displaying, in at least one portion of a display, the proposition, a visual representation of a conceptual relationship between nodes of the database, and information about at least one expression of the proposition.

17. The method according to claim 16, wherein the second set of characteristics is an authority.

18. The method according to claim 16, wherein the first set of characteristics is an authority.

19. The method according to claim 16, wherein each level in the taxonomy includes at least one node.

20. The method according to claim 19, wherein each node is a proposition.

* * * * *